United States Patent
Chang et al.

(10) Patent No.: US 10,554,656 B2
(45) Date of Patent: Feb. 4, 2020

(54) AUTHENTICATION PROCESSING METHOD AND ELECTRONIC DEVICE SUPPORTING THE SAME

(71) Applicant: Samsung Electronics Co., Ltd., Gyeonggi-do (KR)

(72) Inventors: Moon Soo Chang, Gyeonggi-do (KR); Seung Won Oh, Gyeonggi-do (KR); In Ho Kim, Gyeonggi-do (KR); Yong Wan Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 307 days.

(21) Appl. No.: 15/224,976

(22) Filed: Aug. 1, 2016

(65) Prior Publication Data
US 2017/0048240 A1 Feb. 16, 2017

(30) Foreign Application Priority Data
Aug. 12, 2015 (KR) .................. 10-2015-0114148

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01); *H04L 63/0853* (2013.01)

(58) Field of Classification Search
CPC ............. H04L 63/0861; H04L 63/0823; H04L 63/0853; G06F 21/41; G06F 21/32; G06F 21/74; H04W 12/06; G06Q 99/00; G06Q 20/341; G06Q 20/40145; G06Q 20/3221; G06Q 20/36; G06Q 20/00
See application file for complete search history.

(56) References Cited

U.S. PATENT DOCUMENTS 9,141,956 B2 * 9/2015 Black .................. G06Q 20/28
9,306,754 B2   4/2016 Baghdasaryan et al.
(Continued)

OTHER PUBLICATIONS

M. Yildiz and M. Göktürk, "Combining Biometric ID Cards and Online Credit Card Transactions," 2010 Fourth International Conference on Digital Society, St. Maarten, 2010, pp. 20-24. (Year: 2010).*

(Continued)

*Primary Examiner* — Jung W Kim
*Assistant Examiner* — Sameera Wickramasuriya
(74) *Attorney, Agent, or Firm* — Cha & Reiter, LLC

(57) ABSTRACT

An electronic device is provided. The electronic device includes at least one communication module and a processor, wherein the processor is operatively connected to the at least one communication module. The processor is configured to transmit a result of authentication of a user of the electronic device and a request for registration for a security parameter which corresponds to the user and is received from a first external electronic device to a second external electronic device via the at least one communication module in response to a request for execution of a specified function supported by an application, and perform the specified function in response to the request for execution if the registration is successful.

14 Claims, 9 Drawing Sheets

(56) References Cited

U.S. PATENT DOCUMENTS

| | | | | |
|---|---|---|---|---|
| 2003/0208386 A1* | 11/2003 | Brondrup | G06Q 10/02 | 705/5 |
| 2004/0230489 A1* | 11/2004 | Goldthwaite | G06K 7/0004 | 705/26.1 |
| 2006/0229988 A1* | 10/2006 | Oshima | G06Q 20/341 | 705/50 |
| 2007/0022469 A1* | 1/2007 | Cooper | H04K 1/00 | 726/3 |
| 2007/0044143 A1* | 2/2007 | Zhu | G06F 21/33 | 726/8 |
| 2009/0100269 A1* | 4/2009 | Naccache | H04L 9/3271 | 713/186 |
| 2009/0177587 A1* | 7/2009 | Siegal | G06F 21/32 | 705/67 |
| 2010/0100461 A1* | 4/2010 | Laing | G06Q 20/02 | 705/30 |
| 2011/0138450 A1* | 6/2011 | Kesanupalli | G06Q 20/10 | 726/7 |
| 2012/0116918 A1* | 5/2012 | Andersson | G06Q 20/02 | 705/26.41 |
| 2012/0246079 A1* | 9/2012 | Wilson | H04L 63/0807 | 705/67 |
| 2013/0124398 A1* | 5/2013 | Carroll | G06Q 99/00 | 705/39 |
| 2014/0058951 A1* | 2/2014 | Kuppuswamy | G06Q 20/223 | 705/67 |
| 2014/0136419 A1* | 5/2014 | Kiyohara | G06Q 20/3221 | 705/67 |
| 2014/0136421 A1* | 5/2014 | Lee | G06Q 20/40 | 705/71 |
| 2014/0189360 A1* | 7/2014 | Baghdasaryan | H04L 9/3281 | 713/176 |
| 2014/0201086 A1* | 7/2014 | Gadotti | G06Q 20/322 | 705/72 |
| 2015/0032634 A1* | 1/2015 | D'Agostino | G06Q 20/3829 | 705/71 |
| 2015/0227916 A1* | 8/2015 | Inotay | G06Q 20/12 | 705/71 |
| 2016/0044033 A1* | 2/2016 | Hsiang | H04L 63/0853 | 726/5 |
| 2016/0162893 A1* | 6/2016 | Kamal | G06Q 20/405 | 705/44 |
| 2016/0224985 A1* | 8/2016 | Jo | G06Q 20/425 | |

OTHER PUBLICATIONS

F. Aloul, S. Zahidi and W. El-Hajj, "Two factor authentication using mobile phones," 2009 IEEE/ACS International Conference on Computer Systems and Applications, Rabat, 2009, pp. 641-644. (Year: 2009).*

* cited by examiner

AUTHENTICATION PROCESSING METHOD AND ELECTRONIC DEVICE SUPPORTING THE SAME

CLAIM OF PRIORITY

This application claims the benefit of priority under 35 U.S.C. § 119(a) of a Korean patent application filed on Aug. 12, 2015 in the Korean Intellectual Property Office and assigned Serial number 10-2015-0114148, the entire disclosure of which is hereby incorporated by reference.

TECHNICAL FIELD

The present disclosure relates a process of authenticating an electronic device.

BACKGROUND

Recent electronic devices in which security applications are installed provide security-related functions.

An electronic device may provide a specified security function after being registered with a specific authentication server. Here, in the case where the electronic device must be registered with a plurality of authentication servers, a user may have to perform a registration procedure for each authentication server. The foregoing is repetitious and inconvenient.

SUMMARY

Accordingly, an aspect of the present disclosure is to provide an authentication processing method for performing registration and authentication procedures with ease in relation to execution of a security function and an electronic device supporting the same.

In accordance with an aspect of the present disclosure, an electronic device is provided. The electronic device includes at least one communication module and a processor, wherein the processor is operatively connected to the at least one communication module. The processor is configured to transmit a result of authentication of a user of the electronic device and a request for registration for a security parameter which corresponds to the user and is received from a first external electronic device to a second external electronic device via the at least one communication module in response to a request for execution of a specified function supported by an application, and perform the specified function in response to the request for execution if the registration is successful.

In accordance with another aspect of the present disclosure, an authentication processing method is provided. The authentication processing method includes receiving a request for execution of a specified function supported by an application, transmitting, to a second external electronic device via at least one communication module, a result of authentication of a user of an electronic device and a request for registration for a security parameter which corresponds to the user and is received from a first external electronic device, and performing the specified function in response to the request for execution if the registration is successful.

In accordance with another aspect of the present disclosure, an external electronic device (e.g., a service server) is provided. The external electronic device includes a server communication module and a server processor, wherein the server processor is configured to transmit, when an electronic device accesses the external electronic device as a specified function is performed, a security parameter corresponding to a user of the electronic device to the electronic device, receive a request for identifying the user of the electronic device from a second external electronic device in which the electronic device is to be registered, and provide a result of the identifying the user to the second external electronic device.

In accordance with another embodiment, a non-transitory computer-readable medium is presented. The non-transitory computer-readable medium stores a plurality of executable instructions. Execution of the plurality of executable instructions causes: receiving, by an electronic device, a request for execution of a specified function supported by an application; receiving a request for registration for a security parameter which corresponds to the user from a first external electronic device; transmitting, to a second external electronic device via at least one communication module, a result of authentication of a user of an electronic device and a request for registration for the security parameter; and performing the specified function in response to the request for execution if the registration is successful.

DETAILED DESCRIPTION

Figure 1:
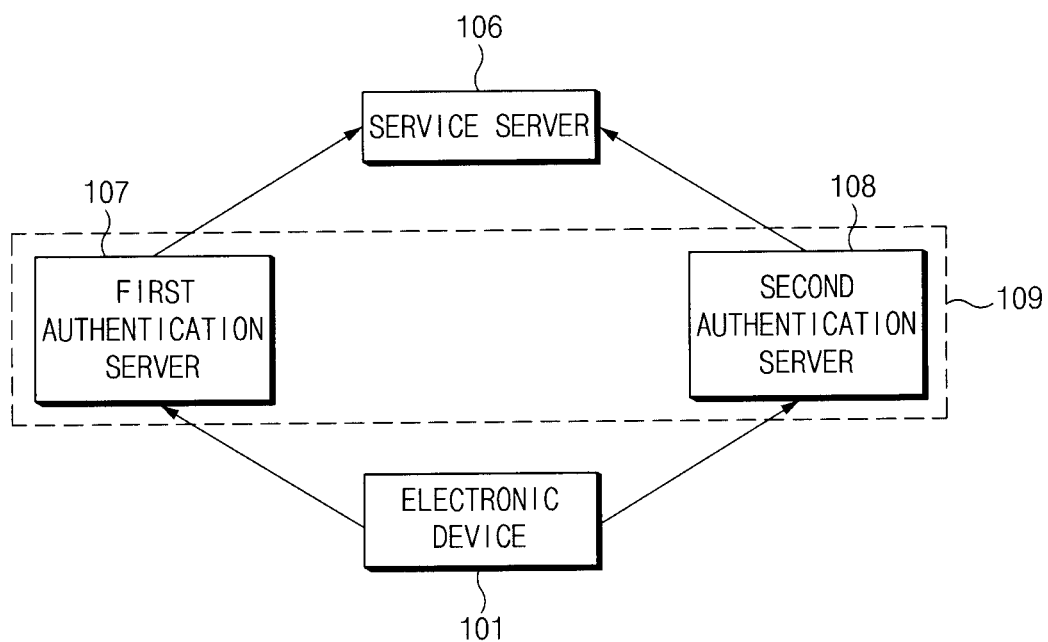
FIG. 1 illustrates an authentication processing environment according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of the embodiments of the present disclosure. Regarding description of the drawings, like reference numerals may refer to like elements.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together with the term. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element. "Wirelessly coupled to" shall include two devices communicating over a radio channel in a point-to-point configuration.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Terms defined in general dictionaries, among the terms used herein, may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments of the present disclosure, the wearable device may include at least one of an accessory-type device (e.g., a watch, a ring, a bracelet, an anklet, a necklace, glasses, a contact lens, a head-mounted device (HDM)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV, or Google TV), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to some various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an authentication processing environment according to an embodiment of the present disclosure.

Referring to FIG. 1, the authentication processing environment, for example, may include a service server 106 (e.g. a first external electronic device), a second external electronic device 109 (e.g., a first authentication server 107 or a second authentication server 108), and an electronic device 101. The authentication processing environment may further include a network or the like for communication between the electronic device 101 and the servers. According to various embodiments of the present disclosure, the authentication processing environment may include two or more authentication servers. Alternatively, the authentication processing environment may include one authentication server. The authentication servers may represent at least one authentication server specified by issuance information or the like during an operation of requesting authentication. The issuance information may represent information issued to a specific user (or a specific electronic device) by the authentication server or a financial server or the like related to the authentication server, or information issued to the user and stored in the electronic device 101. The authentication server may include, for example, at least one of a token issuing server (or a token server provider), a fast identity online (FIDO) server (fingerprint information checking server), or a certificate management server (e.g., a Korea Internet & Security Agency (KISA) server). Alternatively, the token issuing server which performs a token issuing function may serve as the authentication server by storing and managing issuance information input to the electronic device or authentication information (e.g., biometric information) matched to the issuance information and storing and managing the issuance information in response to a registration request from the electronic device. Alternatively, the FIDO server may serve as the authentication server by performing a token issuing function while managing user information (or identification information of the electronic device).

In the authentication processing environment, the electronic device 101 may perform authentication via at least one of a plurality of authentication servers (e.g., the first authentication sever 107 and the second authentication sever 108) in relation to one security server (e.g., network connection function which requires execution of a security function). In this operation, the electronic device 101 may send an authentication request (e.g., an authentication request message) to an authentication server. The authentication request can be related to stored issuance information, based on a security parameter (e.g., a token or an encodable key string or information related to granting a service server access right) provided by the service server 106.

If issuance information is not registered in the authentication server, the authentication server (e.g., the authentication server related to the issuance server between the first authentication server 107 and the second authentication server 108) receiving the authentication request may request the service server 106 to identify the user of the electronic device 101. The electronic device 101 may identify the user based on the security parameter contained in the authentication request message and unique identification information of the electronic device 101 (or unique device information of the electronic device 101). The electronic device 101 may identify the user through background processing while performing user authentication (e.g., collection and comparison of biometric information). Alternatively, the electronic device 101 may identify the user before reception of security information. The security information is received after completion of the user authentication.

If it is confirmed that the electronic device 101 is a valid user, the authentication server 107 or 108 may register the issuance information authentication-requested by the electronic device 101. The authentication server 107 and 108 may also obtain and manage a public key (or signature information) of the electronic device 101. Thereafter, the authentication server 107 or 108 may check validity of the signature information received from the electronic device 101, using the public key. As described above, in the authentication processing environment, a registration procedure related to authentication of the electronic device 101 is processed by a specified authentication server using the security parameter provided by the service server 106, so that repeated registration procedure tasks for the user using the electronic device 101 may be avoided. In the authentication processing environment, the electronic device 101 may check, in a secure execution environment (a trusted execution environment (TEE) or a security world), information (e.g., biometric information such as fingerprint information or iris information) collected in a user authentication operation. For example, the electronic device 101 may store user fingerprint information in the secure execution environment, and may compare similarities between fingerprint information collected in the secure execution environment and the stored fingerprint information. Furthermore, the electronic device 101 may perform generation of signature information or the like in the secure execution environment.

At least one of the plurality of authentication servers 107 and 108 may be accessed in response to user selection. According to an embodiment of the present disclosure, if the user enters, into the electronic device 101, issuance information (e.g., information of a specific card (e.g., a payment card)) issued to access an authentication server, and then executes an application related to a card of which information has been entered, an authentication server related to the card among the plurality of authentication servers 107 and 108 may be selected. If a security application is installed in the electronic device 101, and then is requested to be executed, the electronic device 101 may attempt to access an authentication server related to the security application. The security application may include, for example, a payment application, a user authentication application, an electronic seal application, etc.

The electronic device 101 may send the plurality of authentication servers 107 and 108 may receive an authentication request message to access the authentication servers 107 and 108. The authentication server 107 or 108 may check whether the electronic device 101 requesting authentication is registered, therewith. If the electronic device 101 is not registered, the authentication server 107 or 108 may transfer the security parameter contained in the authentication request message to the service server 106 to identify the user of the electronic device 101. In the case where the user is a valid user (or a user who has previously performed a specified authentication process in relation to a user account), the authentication server 107 or 108 may transmit information indication non-registration to the electronic device 101. Thereafter, the authentication server 107 or 108 may perform registration.

If the issuance information of the electronic device 101 is registered, the authentication servers 107 and 108 may check specific information (e.g., signature information or the like) provided by the electronic device 101. The authentication servers 107 and 108 may then provide specified security information to the electronic device 101 according to the result. If the security information provided to the electronic device 101 is received, the authentication server 107 or 108 may perform authentication on the received security information to support execution of a security function of the electronic device 101.

The service server 106 may provide a security application to the electronic device 101. The service server 106 may provide a security parameter when the electronic device 101 makes an access request. The service server 106 may identify the user of the electronic device 101 in response to a request from at least one of the authentication server 107 or 108. The service server 106 may provide the identification to the authentication servers 107 and 108. The service server 106 may be, for example, a payment-related server. The service server 106 may register user information so that a security function is performed in relation to the electronic device 101. The service server 106 may collect and provide payment details to the electronic device 101 in response to execution of a security function (e.g., a payment function), or may collect and transfer additional information related to payment.

According to various embodiments of the present disclosure, the service server 106 may determine whether to transmit a security parameter, based on user identification (customer identification (CI)). For example, the service server 106 may compare user information (e.g., login information, electronic device or user identification information, etc.) collected from the electronic device 101 with stored information (e.g., stored user account information, or stored electronic device or user identification information). If the user information is valid, the service server 106 may transmit a specified security parameter to the electronic device 101.

According to various embodiments of the present disclosure, the service server 106 may manage, via a user account or the like, information for issuance information stored in the electronic device 101. For example, the service server 106 may obtain, from the electronic device 101, issuance information (e.g., card information or the like) generated online or offline by a specific financial server or issuance information (e.g., a service account ID or the like) issued online or offline to a specific user or the specific electronic device 101 by a server which provides a specific function. In the case where the electronic device 101 having non-registered issuance information requests service registration, the service server 106 may handle automatic registration of non-registered issuance information for non-registered authentication servers. In this operation, the service server 106 may share information that the electronic device 101 has registered in a specific authentication server with another authentication server.

As described above, the service server 106 may manage a plurality of authentication servers (such as first authentication server 107 and second authentication server 108). The service server 106 may process automatic registration of similar services or associated services in response to registration of the issuance information of the electronic device 101. In this operation, the service server 106 may notify the electronic device 101 of automatic registration of the similar or associated services, and may proceed with the automatic registration in response to approval (or allowance or confirmation) from the electronic device 101. Alternatively, the service server 106 may notify the electronic device 101 while processing the processing automatic registration without obtaining approval from the electronic device 101. According to various embodiments of the present disclosure, the service server 106 may transfer account information to an authentication server via the electronic device 101. Furthermore, the service server 106 may receive a user authentication result from the electronic device 101, and may transfer two types of information (account information and the authentication result) to an authentication server.

According to various embodiments of the present disclosure, the service server 106 may process user authentication in relation to providing enhanced security during a login process of the electronic device 101. For example, the service server 106 may authenticate a user, on behalf of the electronic device 101, using biometrics and register the user. This allows subsequently bypassing biometric authentication after login of the electronic device 101. In relation to this operation, the service server 106 may, in real time or at the time of login, obtain and manage the issuance information stored in the electronic device 101. Accordingly, when a payment operation or a security authentication operation is performed, the electronic device 101 may only perform an operation of selecting issuance information, and the service server 106 may perform an operation of providing security information required to perform a function or registration related to security processing.

According to the above-mentioned various embodiments of the present disclosure, a service server according to an embodiment of the present disclosure may include a server communication module and a server processor, wherein the server processor may be configured to transmit, when an electronic device accesses the service server as a specified function is performed, a security parameter corresponding to a user of the electronic device to the electronic device, receive a request for identifying the user of the electronic device from a second external electronic device in which the electronic device is to be registered, and provide a result of the identifying the user to the second external electronic device.

According to various embodiments of the present disclosure, the server processor may be configured to provide, if registration of the electronic device is successful, registered information of the electronic device to other second external electronic devices related to pieces of non-registered information stored in the electronic device.

According to various embodiments of the present disclosure, the server processor may be configured to provide, if registration of the electronic device fails, registration failure information of the electronic device to the other second external electronic devices related to the pieces of non-registered information stored in the electronic device.

According to various embodiments of the present disclosure, the server processor may be configured to receive a user identification request including the security parameter, and perform user identification through comparison with the security parameter provided to the electronic device.

According to the above-mentioned various embodiments of the present disclosure, an electronic device (e.g., the service server 106) according to an embodiment of the present disclosure may include a communication module (e.g., a communication module of the service server) and a processor (e.g., a processor of the service server), wherein the processor may be configured to transmit, when a first external electronic device (e.g., the electronic device 101) running a security function application accesses the electronic device as a specified function is performed, a security parameter corresponding to a user of the first external electronic device to the first external electronic device via the communication module, receive a request for identifying the user of the first external electronic device from a second external electronic device (e.g., an authentication server) in which the first external electronic device is to be registered (e.g., registered in relation to the use of non-registered issuance information stored in the first external electronic device), and provide a result of the identifying the user to the second external electronic device.

In the case where the electronic device 101 performs a security function among functions provided by the service server 106, the electronic device 101 may obtain authentication (e.g., authentication for specific issuance information) via a specific authentication server among the authentication servers 107 and 108, and may perform the security function of the service server 106 based on the authentication. For example, the electronic device 101 may receive a security parameter from the service server 106 while attempting to access the service server 106. In relation to an authentication request, the electronic device 101 may provide, to an authentication server 109, unique device information (or unique device identification information) of the electronic device 101 and the obtained security parameter. In this operation, if specific issuance information is not registered in the authentication server 109, the electronic device 101 may automatically perform a registration procedure of the non-registered issuance information. According to an embodiment of the present disclosure, the electronic device 101 may perform the procedure of registering in the authentication server through background processing. When the registration is completed normally, the electronic device 101 may receive security information related to execution of a security function from the authentication server, and may perform a function (e.g., a security function related to a specified application) based on the security information.

According to the above-mentioned various embodiments of the present disclosure, an authentication server according to an embodiment of the present disclosure may include a server memory for storing data related to authentication of an electronic device and a server processor electrically connected to the server memory, wherein, upon receiving an authentication request message including issuance information and at least a part of a security parameter issued by a service server from the electronic device, the server processor may transfer the authentication request message to the service server so as to identify a user of the electronic device.

According to various embodiments of the present disclosure, if the issuance information is not registered, the server processor may transmit, to the electronic device, information indicating a non-registered state of the issuance information.

According to various embodiments of the present disclosure, upon receiving a registration request message including a public key from the electronic device, the server processor may perform registration of the issuance information, and may map the public key to identification information of the electronic device so as to store the public key and the identification information.

According to various embodiments of the present disclosure, after performing the registration, the server processor may transmit specified security information to the electronic device.

Figure 2:
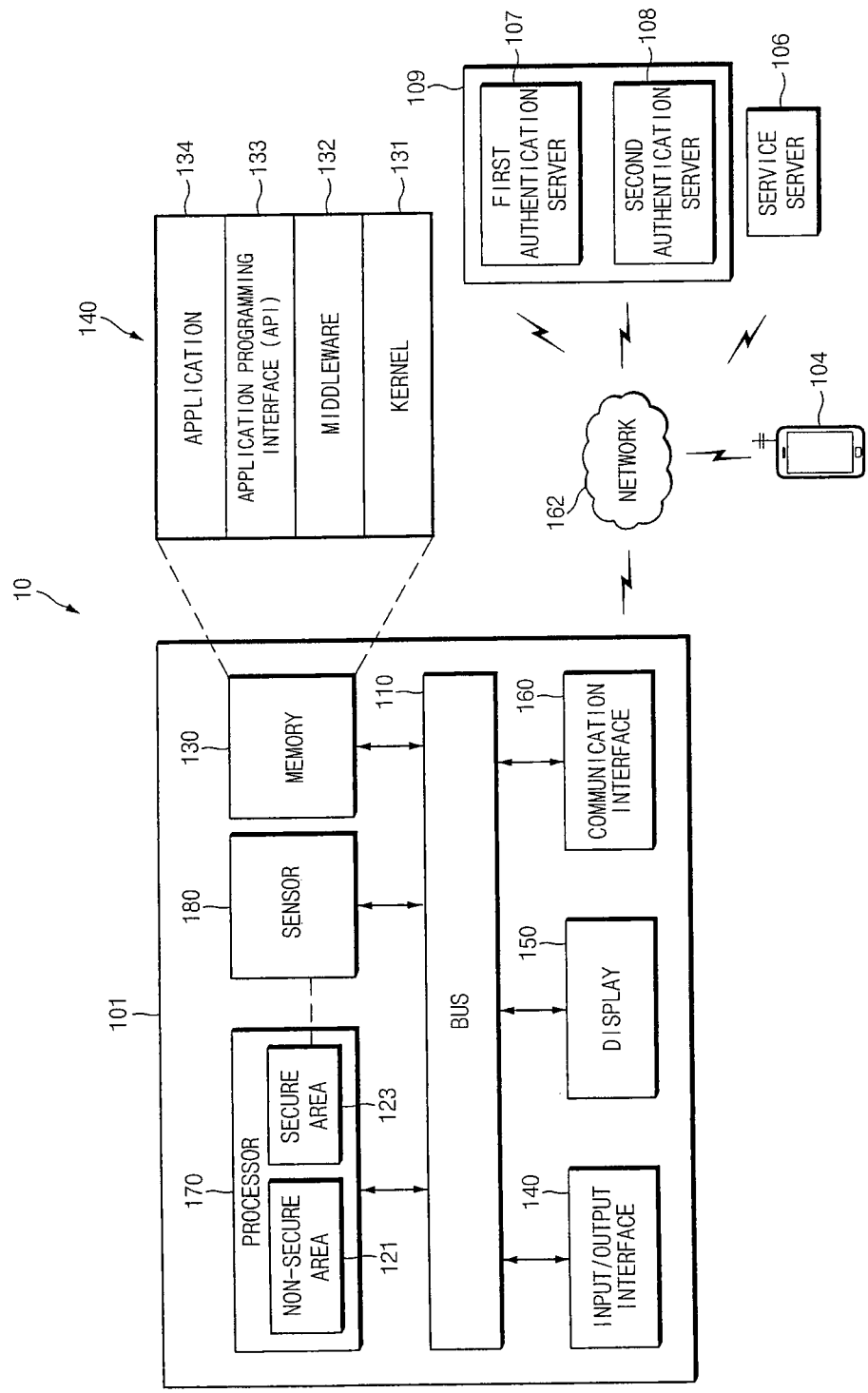
FIG. 2 is a diagram illustrating an example of an authentication processing environment according to an embodiment of the present disclosure.

FIG. 2 is a diagram illustrating an example of an authentication processing environment according to an embodiment of the present disclosure.

Referring to FIG. 2, an authentication processing environment 10, for example, may include the electronic device 101, a network 162, the first authentication server 107, the second authentication server 108, the service server 106, and an electronic device 104. The electronic device 104 may communicate with the electronic device 101 via the network 162. The electronic device 104, for example, may perform a function which is the same as or similar to that of the electronic device 101. According to various embodiments of the present disclosure, the electronic device 104 may be a Point of Sale (POS) device. Alternatively, the electronic device 104 may be a management server for managing a POS device. According to various embodiments of the present disclosure, the electronic device 104 may be an external electronic device (e.g., a wearable device) wirelessly connected to the electronic device 101 through wireless communications (e.g., BT communications, direct Wi-Fi communications, etc.).

The network 162 may support establishment of a communication channel between the electronic device 101 and the service server 106. Furthermore, the network 162 may support establishment of communication channels between the electronic device 101 and the authentication servers 107 and 108. According to an embodiment of the present disclosure, the network 162 may include at least one of an Internet network, a Wi-Fi network, or a mobile communication network based on a mobile base station, and the Public Switched Telephone Network (PSTN). The network 162 may transfer a message related to access from the electronic device 101 to the service server 106. According to an embodiment of the present disclosure, the network 162 may transfer a security parameter request message from the electronic device 101 to the service server 106. The security parameter request message may include, for example, at least one of identification information (e.g., type information of an electronic device, connection information of an electronic device, unique address information of an electronic device, etc.), user information (e.g., a user name, specified number information assigned to a user, etc.), or application-related information (e.g., application type information, application installation time information, etc.) of the electronic device 101. The network 162 may transfer, to the electronic device 101, a security parameter generated by the service server 106.

The network 162 may transfer authentication-related information (e.g., an authentication request message, a registration request message, signature information, etc.) of the electronic device 101 to any one of the authentication servers 107 and 108. The authentication request message transferred to the authentication server may include, for example, issuance information, a security parameter, the identification information of the electronic device 101. The registration request message may include, for example, a public key generated by the electronic device 101 based on a security parameter, etc. The signature information may include information signed with specific data using the private key generated with the public key by the electronic device 101.

The service server 106 may have the same configuration as the service server described above with reference to FIG. 1. According to an embodiment of the present disclosure, the service server 106 may support security parameter provision of the electronic device 101, user identification of the authentication servers 107 and 108, and information processing for performing a function of the electronic device 101. The service server 106 may store and manage device identification information of the electronic device 101, account information related to the electronic device 101, security parameter information assigned to the electronic device 101, etc. The service server 106 may process user identification based on the stored and managed information.

The first authentication server 107 and the second authentication server 108, for example, may represent servers for processing required authentication in relation to execution of a specific security function of the electronic device 101. According to an embodiment of the present disclosure, the first or second authentication server 107 or 108 may represent an authentication server related to financial information processing such as payment or account transfer, an authentication server related to stock brokerage, an authentication server related to specific secure instant messaging, email, an authentication server for processing user authentication related to playing a specific online-game through an internet, use of an application, access to, and editing rights to information, providing medical images, etc.

The authentication servers 107 and 108 may include a communication module for communicating with the electronic device 101 and the service server 106, a server processor for performing authentication processing of the electronic device 101, and a server memory for storing data related to authentication processing of the electronic device 101. The server processor may provide, to the service server 106, an authentication request message including a security parameter provided by the electronic device 101 during an authentication requesting process, so as to identify the user of the electronic device 101. In relation to the electronic device 101 for which user identification is completed and public key association is completed, the server memory may store the identification information of the electronic device 101 and the public key information provided by the electronic device 101 so that the identification information is mapped to the public key information.

The electronic device 101 can include a processor 170. The processor 170 can be logically divided into a secure area 123 and a non-secure area 121. If a security function execution request is made in the non-secure area 121, the electronic device 101 may process security parameter collection, an authentication request, a registration request, and executed a security function execution in the secure area 123. In relation to this operation, the electronic device 101 may include a bus 110, the processor 170, a memory 130, an input/output interface 140, a display 150, a communication interface 160, and a sensor 180. According to various embodiments of the present disclosure, the memory 130 may include, for respectively supporting the non-secure area 121 and the secure area 123, physically separated individual memories or two logically separated areas (e.g., a normal memory area accessed by the non-secure area 121 and a secure memory area accessed by the secure area 123). The non-secure area 121 and the secure area 123 may be configured with individual hardware-type processors. Alternatively, the non-secure area 121 and the secure area 123 may be loaded on the memory 130 in the form of software. In this case, the processor 170 may selectively access the non-secure area 121 and the secure area 123 of the memory 130 so as to perform a normal function and a security function respectively.

The bus 110 may include a circuit for connecting the above-mentioned elements 120 to 180 to each other and transferring communications (e.g., control messages and/or data) among the above-mentioned elements. For example, the bus 110 may receive a specified function access request via the input/output interface 140. The bus 110 may transfer, to the communication interface 170, a security parameter request of an application running in the non-secure area 121. The bus 110 may transfer a security parameter received by the communication interface 160 to the secure area 123 in response to control by the processor 170. The bus 110 may connect the sensor 180 to the processor 170, and may transfer information collected by the sensor 180 to the processor 170. According to various embodiments of the present disclosure, the electronic device 101 may include a signal wiring for directly connecting the sensor 180 and the secure area 123 without using the bus 110.

The processor 170 may include at least one of a central processing unit (CPU), an application processor (AP), or a communication processor (CP). The processor 170 may perform data processing or an operation for communication and/or control of at least one of the other elements of the electronic device 101. According to an embodiment of the present disclosure, the processor 170 may allocate at least one processor (or a task or a thread) for supporting operation of the non-secure area 121. The processor 170 may allocate at least one processor (or a task or a thread) for supporting operation of the secure area 123. According to various embodiments of the present disclosure, the processor 170 may be designed and operated as hardware on which the non-secure area 121 is loaded and hardware on which the secure area 123 is loaded. According to various embodiments of the present disclosure, the processor 170 may include a processor related to the non-secure area 121 and a processor related to the secure area 123. The processor 170 may perform execution of an application related to access to the service server 106, acquisition of a security parameter from the service server 106, an authentication request based on the security parameter, a registration request according to a registration state, and security function execution processing.

The memory 130 may include a volatile memory and/or a nonvolatile memory. The memory 130 may store an instruction or data related to at least one of the other elements of the electronic device 101. According to an embodiment of the present disclosure, the memory 130 may store a program related to the non-secure area 121. The memory 130 may store a program related to the secure area 123.

According to an embodiment of the present disclosure, the memory 130 may store instructions executable by the processor 170 in the form of software and/or a program. The program may include a kernel, a middleware, an application interface, and an application. At least a portion of the kernel, the middleware, or the application interface may be referred to as an operating system (OS).

The kernel may control or manage system resources (e.g., the bus 110, the processor 170, the memory 130, etc.) used to perform operations or functions of other programs (e.g., a middleware, an application interface, or an application). Furthermore, the kernel may provide an interface for allowing the middleware, the application interface, or the application to access individual elements of the electronic device 101 in order to control or manage the system resources.

The middleware may serve as an intermediary between the application interface or the application and the kernel so that the application interface or the application communicates and exchanges data with the kernel. Furthermore, the middleware may perform a control operation (e.g., scheduling or load balancing) with respect to operation requests received from the application by using, for example, a method of assigning a priority for using system resources (e.g., the bus 110, the processor 170, the memory 130, etc.) of the electronic device 101 to at least one application.

The application interface (e.g., an application protocol interface (API)), which is an interface for allowing the application to control a function provided by the kernel or the middleware, may include at least one interface or function (e.g., an instruction) for, for example, file control, window control, image processing, or character control.

The application may be a program related to at least one function provided to a user by operating the electronic device 101. According to an embodiment of the present disclosure, the application may include a banking application, a stock application, an email application, a data management application, a cloud application, etc. These applications may call an application for processing security operation information, while running. The application may include at least one program routine related to security operation information processing.

According to an embodiment of the present disclosure, the memory 130 may store security software and/or a security program. The security program may include a security kernel, a security function middleware, a security function application interface, and a security function application. At least a portion of the security kernel, the security function middleware, or the security function application interface may be referred to as a security operating system (e.g., a trust zone operating system (TZOS)). At least one of the security kernel, the security function middleware, or the security function application interface may be operated in order to support an execution environment having a security level in the state in which the at least one of the security kernel, the security function middleware, or the security function application interface has a right to control at least one of the bus 110, the memory 130, the input/output interface 140, the display 150, the communication interface 170, or the sensor 180.

According to various embodiments of the present disclosure, the electronic device may operate a plurality of execution environments having security levels in order to enhance security. The execution environments may include a trusted execution environment (TEE) having a higher security level than that of a rich execution environment (REE). The electronic device may operate the secure execution environment through physical modification of hardware or logical modification of software.

In the trusted execution environment, data which requires a relatively high security level may be stored within a secure environment and a relevant operation may be performed. The trusted execution environment may operate on an application processor included in a processor (e.g., the processor 170) of the electronic device, and may operate based on a trusted hardware structure determined during a manufacturing process of the electronic device. The trusted execution environment may divide the application processor and the memory into a normal memory area and a secure memory area, and may operate in a secure area. The trusted execution environment may be set so that software or hardware which requires security may operate only in a secure area. The electronic device may operate the trusted execution environment through physical modification of hardware or logical modification of software.

According to an embodiment of the present disclosure, the trusted execution environment may be implemented using a trustzone technology of ARM. According to the trustzone technology, a processor (e.g., the processor 170) may be divided into two virtual cores so that the rich execution environment operates in one of the virtual cores and the trusted execution environment operates in the other virtual core. According to an embodiment of the present disclosure, the trusted execution environment may be implemented using an additional processor. Alternatively, the trusted execution environment may be implemented as an on-chip type. According to an embodiment of the present disclosure, the security function application may include a security operation information application related to at least one of a payment application, a user authentication application, an electronic seal application, a banking application, a stock application, an email application, a data management application, or a cloud application.

The input/output interface 140 may serve to transfer an instruction or data input from a user or another external device to (an)other element(s) of the electronic device 101. Furthermore, the input/output interface 140 may output an instruction or data received from (an)other element(s) of the electronic device 101 to the user or another external device. The input/output interface 140 may include, for example, at least one physical button or touch button or a touchpad or a touch screen. Furthermore, the input/output interface 140 may include a means for input by an electronic pen or the like. Moreover, the input/output interface 140 may include an audio collecting device capable of collecting audio signals.

The input/output interface 140 may generate an input signal according to a user input in an environment in which the non-secure area 121 or the secure area 123 is operated. For example, the input/output interface 140 may transfer, to the non-secure area 121, an input signal obtained in an environment in which the non-secure area 121 is operated. The input/output interface 140 may transfer, to the secure area 123, an input signal obtained in an environment in which the secure area 123 is operated. The input/output interface 140 may include at least one output device capable of outputting guide information related to security information processing (e.g., execution or termination of an application having a security function, acquisition of a security parameter, an authentication request, a registration request, reception of security information, etc.). For example, the input/output interface 140 may include a speaker, lights, a vibration output device, etc. The input/output interface 140 may output at least one of specified audio data, a specified flickering pattern, or a specified vibration pattern corresponding to at least one of reception of a security parameter, storage of a security parameter, generation of an authentication request message, generation of a registration request message including a public key, transmission of signature information generated based on a private key, or execution of a security function. At least one of the audio data, the flickering pattern, or the vibration pattern may not be provided according to a setting or according to whether the electronic device 101 supports it.

The display 150 may include, for example, a liquid crystal display (LCD), a light-emitting diode (LED) display, an organic light-emitting diode (OLED) display, a microelectromechanical systems (MEMS) display, or an electronic paper display. The display 150 may present various content (e.g., a text, an image, a video, an icon, a symbol, or the like) to the user. The display 150 may include a touch screen, and may receive a touch, gesture, proximity or hovering input from an electronic pen or a part of a body of the user.

The display 150 may output at least one screen related to execution of a security application. For example, the display 150 may output a screen according to execution of a security application, a screen related to user identification (e.g., fingerprint information checking), a screen related to execution of a security function (e.g., a payment function), etc. While the processor 170 performs, in the background, reception of a security parameter, storage of a security parameter, generation of an authentication request message, generation of a registration request message including a public key, or transmission of signature information generated based on a private key, the display 150 may not output a screen interface related to execution of the foregoing operations. Alternatively, according to an embodiment of the present disclosure, the display 150 may output at least one object related to execution of the foregoing operations. For example, the display 150 may output at least one of a guide message (or a popup or the like) related to the reception or storage of a security parameter, a guide message related to the generation and transmission of an authentication request message, a guide message related to the generation and transmission of a registration request message including a public key, or a guide message related to the generation and transmission of signature information generated based on a private key.

The communication interface 170, for example, may set communications between the electronic device 101 and an external device. For example, the communication interface 160 may be connected to a network via wired communications or wireless communications so as to communicate with the external device. For example, at least one of cellular communication protocols such as LTE, LTE-A, CDMA, WCDMA, UMTS, WiBro, GSM, or the like may be used for the wireless communications. The wired communications may include at least one of universal serial bus (USB), high definition multimedia interface (HDMI), recommended standard 232 (RS-232), plain old telephone service (POTS), or the like. The network may include at least one of telecommunications networks, for example, a computer network (e.g., a LAN or WAN), the Internet, or a telephone network.

The communication interface 160 may establish a communication channel to at least one of the server 106 and the authentication servers 107 and 108 via the network 162. The communication interface 160 may receive a security parameter in response to control by the processor 170. The communication interface 160 may perform transmission of an authentication request message, transmission of a registration request message including a public key, transmission of signature information generated based on a private key, etc. The communication interface 160 may transmit payment-related information to the service server 106 in response to operation of a security application. According to various embodiments of the present disclosure, the communication interface 160 may receive payment details information from at least one of a financial server related to the authentication servers or the service server 106, a POS device for processing payment, or a management server for managing the POS device. The payment details information may include registration-related information (e.g., a registration date, a registered authentication server name, user information related to issuance information, etc.) according to registration of non-registered issuance information.

Figure 3:
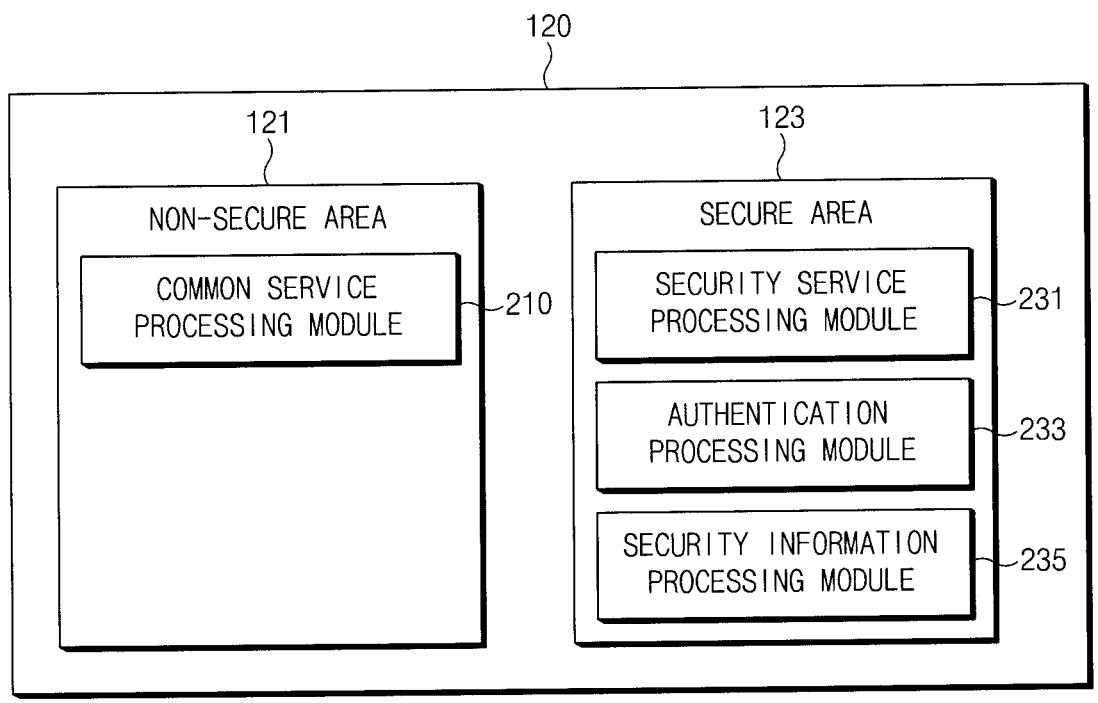
FIG. 3 is a diagram illustrating an example of a processor according to an embodiment of the present disclosure.

The sensor 180 may include at least one sensor capable of collecting biometric information. According to an embodiment of the present disclosure, the sensor 180 may include a fingerprint sensor capable of collecting fingerprint information of the user. The sensor 180 may include a retinal sensor capable of collecting iris information of the user. The sensor 180 may collect various biometric information such as unique heart rate information of the user. The sensor 180 may provide collected biometric information to the secure area 123. In relation to this operation, the sensor 180 may be connected to the secure area 123 via the bus 110 or may be directly connected to the secure area 123 so as to provide the biometric information. After a specified application is executed, the sensor 180 may be automatically enabled when a security function included in the application is selected. The processor 170 may output guide information (e.g., a text or an image for giving instructions for a fingerprint recognition operation) related to collection of specific biometric information in response to enablement of the sensor 180. FIG. 3 is a diagram illustrating an example of a processor according to an embodiment of the present disclosure.

Referring to FIG. 3, the processor 170 according to an embodiment of the present disclosure may include the non-secure area 121 and the secure area 123.

The non-secure area 121 may include a common service processing module 210. The common service processing module 210 may process non-security functions of the electronic device 101. For example, the common service processing module 210 may execute a specified application when the user makes a specific gestures or selects a specified icon. When executing the specified application, the common service processing module 210 may attempt to access the service server 106. The common service processing module 210 may request a security parameter from the service server 106 by default, or according to a setting, or in response to a user input. Upon receiving a security parameter, the common service processing module 210 may transfer the security parameter to the secure area 123. According to an embodiment of the present disclosure, the common service processing module 210 may output, to the display 150, a screen according to execution of the specified application. The common service processing module 210 may provide, to the execution screen of the specified application, at least one icon or menu for executing a security function. In the case where a specified menu or icon is selected or a security function is set to be executed by default, the common service processing module 210 may notify a security function to a security service processing module 231. In this operation, the common service processing module 210 may request and receive a security parameter from the service server 106.

The secure area 123 may represent an area in which applications that require a security function of the electronic device 101 are run. The secure area 123 may not allow invalid accesses, and may prevent the secure area 123 from being used by unauthorized accesses by verifying valid users or processes. In relation to this operation, the secure area 123 may include the security service processing module 231, an authentication processing module 233, and a security information processing module 235.

Upon receiving a security function execution request from the common service processing module 210, the security service processing module 231 may perform a procedure required for executing a security function. For example, the security service processing module 231 may process a security parameter. Alternatively, the security service processing module 231 may receive a security parameter from the common service processing module 210 by communicating with the common service processing module 210, and may store the security parameter in a specified area such as a secure memory area. The security service processing module 231 may transfer the security parameter to the authentication processing module 233.

The authentication processing module 233 may generate an authentication request message including at least a part of the security parameter. The authentication processing module 233 may transmit the authentication request message to a specified authentication server using the communication interface 160. According to an embodiment of the present disclosure, the authentication processing module 233 may obtain an authentication server address included in currently selected specific issuance information, and may transmit the authentication request message based on the authentication server address. Alternatively, the authentication processing module 233 may transmit the authentication request message based on an authentication server address set by default. The authentication processing module 233 may receive an authentication result from the authentication server. In the case where the authentication result is processed normally, the authentication processing module 233 may transmit, to the authentication server, signature information signed with a specified private key. Upon receiving security information (e.g., information for executing a specified security function, such as OTC information, etc.) transferred from the authentication server in response to the signature information, the authentication processing module 233 may transfer the security information to the security information processing module 235.

According to various embodiments of the present disclosure, in the case where the authentication result indicates a non-registered state of issuance information, the authentication processing module 233 may process a registration request. In relation to this operation, the authentication processing module 233 may generate a public key and a private key. According to an embodiment of the present disclosure, the authentication processing module 233 may generate a public key and a private key using specific key information and specified information (e.g., at least a part of a security parameter, at least a part of electronic device identification information, at least a part of user information, or the like). The authentication processing module 233 may generate a registration request message including a generated public key and private key. The authentication processing module 233 may transmit the registration request message to the authentication server. The authentication processing module 233 may receive security information transferred from the authentication server in response to the registration request message. In the case where the registration request message of the electronic device 101 is not valid, the authentication processing module 233 may receive a registration disapproval message from the authentication server. In this case, the authentication processing module 233 may output a corresponding message (e.g., a registration disapproval message) so as to notify that issuance information currently operated is unable to be used.

The authentication processing module 233 may perform the above-mentioned registration process of non-registered issuance information based on background processing. "Background processing" shall be understood to mean a process that occurs seamlessly without user input or initiation, and does not provide output that the user would recognize, such as output data on the display. Background processing may also be understood to have low priority to other processes executed on the electronic device when resource contention occurs. Accordingly, an output of a guide message or a screen UI related to the registration process of non-registered issuance information may be skipped. According to various embodiments of the present disclosure, the authentication processing module 233 may collect and store log information in relation to an automatic registration process of non-registered issuance information.

The security information processing module 235 may receive security information from the authentication processing module 233. The security information processing module 235 may perform a specific security function based on the security information. For example, the security information processing module 235, in response to the security information, may perform normally a security function selected while the common service processing module 210 is operated. According to an embodiment of the present disclosure, the security information processing module 235 may perform a payment transaction based on the security information. The security information processing module 235 may output, to the display 150 by default, payment details information obtained by performing the payment transaction, in response to a user request or upon completion of payment. In this operation, the security information processing module 235 may also display information on a registration process of non-registered issuance information.

According to the above-mentioned various embodiments of the present disclosure, an electronic device according to an embodiment of the present disclosure may include at least one communication module and a processor, wherein the processor may be configured to transmit a result of authentication of a user of the electronic device and a request for registration for a security parameter which corresponds to the user and is received from a first external electronic device (e.g., a service server) to a second external electronic device (e.g., an authentication server) via the at least one communication module in response to a request for execution of a specified function supported by an application, and perform the specified function in response to the request for execution if the registration is successful.

According to various embodiments of the present disclosure, the processor may be configured to make the request for registration after the request for execution automatically or without intervention of a user input or in a background processing manner, and perform the specified function automatically or without intervention of a user input when the registration is successful.

According to various embodiments of the present disclosure, the electronic device may further include a biometric sensor, and the authentication of the user of the electronic device may be performed via the biometric sensor.

According to various embodiments of the present disclosure, the authentication of the user of the electronic device may be performed in response to the request for execution of the specified function.

According to various embodiments of the present disclosure, regarding the authentication of the user of the electronic device, the result of the authentication performed within a specified time may be used.

According to various embodiments of the present disclosure, the security parameter corresponding to the user may be set to be received from the first external electronic device in response to execution of the application.

According to various embodiments of the present disclosure, the processor may be configured to automatically transmit a registration request message in response to reception of information indicating a non-registered state from the second external electronic device.

According to various embodiments of the present disclosure, the processor may add a specified public key to the registration request message to transmit the public key.

According to various embodiments of the present disclosure, the processor may be configured to generate a payment request message based on security information received from the second external electronic device, and output the payment request message via the at least one communication module.

According to various embodiments of the present disclosure, the processor may be configured to output details of the registration to payment details information obtained by performing the specified function.

According to various embodiments of the present disclosure, the processor may be configured to differently display a registered state and the non-registered state or output a guide message for notifying completion of the registration.

According to various embodiments of the present disclosure, the processor may be configured to provide a user interface related to a user authentication procedure based on biometric information when the request for execution of the specified function is made, and perform processing required for the registration by background processing while the user interface is provided.

According to the above-mentioned various embodiments of the present disclosure, an electronic device according to an embodiment of the present disclosure may include a housing, a memory disposed in the housing, a user interface, and a processor electrically connected to the memory and the user interface, wherein the memory may store instructions that, when executed, cause the processor to automatically register non-registered issuance information in a specified authentication server related to the issuance information in response to a request for execution of a specified security function, and perform the specified security function based on security information received after performing registration.

According to the above-mentioned various embodiments of the present disclosure, an electronic device according to an embodiment of the present disclosure may include a memory and a processor electrically connected to the memory, wherein the memory may store instructions that, when executed, cause the processor to transmit an authentication request message to an authentication server related to specified issuance information in response to a request for execution of a specified security function, transmit signature information to the authentication server in response to reception of an authentication result, and receive security information from the authentication server according to whether the signature information is valid.

According to various embodiments of the present disclosure, the memory may store instructions that, when executed, cause the processor to receive a security parameter from a service server related to execution of the security function when the request for execution of the security function is made.

According to various embodiments of the present disclosure, the memory may store instructions that, when executed, cause the processor to add at least a part of the security parameter to the authentication request message to transmit the at least a part of the security parameter.

According to various embodiments of the present disclosure, the memory may store instructions that, when executed, cause the processor to generate the signature information based on a private key related to a public key registered in the authentication sever.

According to various embodiments of the present disclosure, the memory may store instructions that, when executed, cause the processor to provide a user interface related to a user authentication procedure based on biometric information when the request for execution of the security function is made, and perform transmission of the authentication request message and the signature information by background processing while the user interface is provided.

Figure 4:
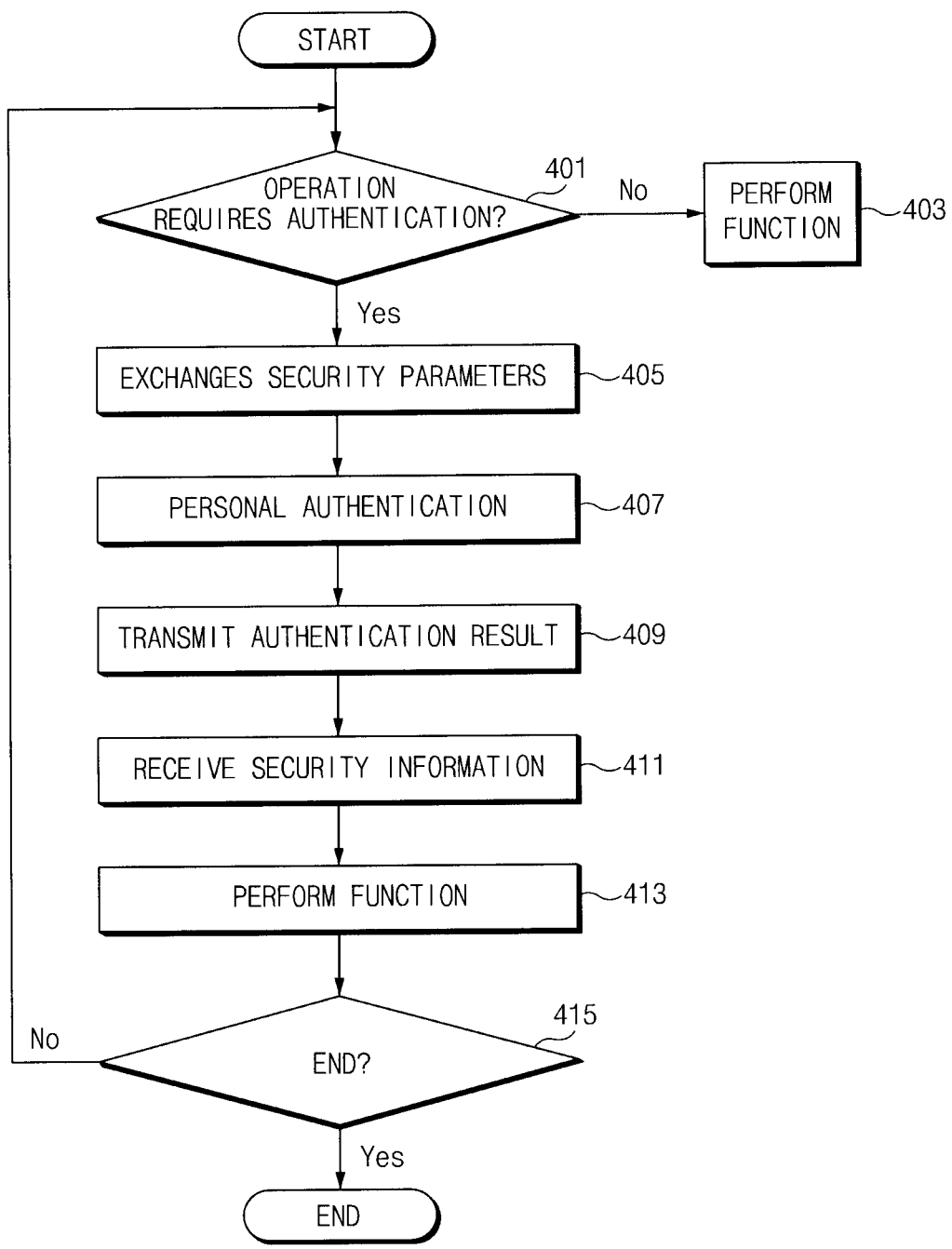
FIG. 4 is a diagram illustrating an electronic device operating method related to an authentication processing method according to an embodiment of the present disclosure.

FIG. 4 is a diagram illustrating an electronic device operating method related to an authentication processing method according to an embodiment of the present disclosure.

Referring to FIG. 4, in operation 401, when an event occurs, the processor 170 may determine whether the event is related to an operation which requires authentication. According to various embodiments of the present disclosure, when an input event or a scheduled event occurs, the processor 170 determines whether the event is related to execution of a specified application which requires authentication in operation 401. If the event is not related to execution of the specified application, the processor 170 may handle execution of a function according to the type of the event in operation 403. For example, the processor 170 may perform a file playback function, a file editing function, a web surfing function, or the like according to the type of the event. If the event is related to execution of the specified application, the processor 170 may execute the specified application. The processor 170 may output an execution screen in response to execution of the specified application. In relation to this operation, the electronic device 101 may output, to the display 150, a web page including security function items provided by the service server 106 as the specified application is executed. Alternatively, the electronic device 101 may output an application execution screen including a specified function item as the specified application is executed. According to various embodiments of the present disclosure, the execution of the specified application or the selection of a function that requires authentication may be performed by one specified gesture motion. For example, if a specified gesture event occurs in a sleep state or a standby screen state or in a state where a specific application is executed, the electronic device 101 may recognize the gesture event as an event corresponding to the selection of a security function of the specified application, and may perform operation 405 as a function which requires authentication is selected.

According to various embodiments of the present disclosure, if the specified event occurs, the processor 170 may exchange security parameters in operation 405. In relation to this operation, while the specified application is executed, the processor 170 may attempt to access the service server 106 and may receive a security parameter from the service server 106. Alternatively, when a function which requires an authentication operation is requested to be executed, the processor 170 may access the specified service server 106 and may receive the security parameter from the service server 106.

The security parameter may include, for example, information required for operating a specified application of the electronic device 101 in the service server 106. The security parameter, for example, may be parsed by the processor 170 so as to become an element extractable type (e.g., at least one of an XML document type, a data packet type, or a database type as a package type). The security parameter, for example, may include user identification information (user ID), electronic device identification information, application-related information, etc. The security parameter may be stored in an area in which a security function of the processor 170 is provided. According to various embodiments of the present disclosure, the security parameter may be decoded in a software area in which a security function is provided, and may be stored in a hardware area in which a security function is provided.

After exchanging security parameters, the processor 170 may perform personal authentication (or user authentication) in operation 407. For example, the processor 170 may collect biometric information. According to an embodiment of the present disclosure, the processor 170 may enable a fingerprint sensor, and may output a prompt for requesting fingerprint sensing. When the biometric information is obtained, the processor 170 may compare the biometric information with stored information to determine whether the biometric information matches the stored information. If a result of the comparison is a match, the processor 170 may authenticate the user. The above-mentioned operation may be performed in the trusted execution environment.

In operation 409, the processor 170 may transmit a result of personal authentication. According to an embodiment of the present disclosure, the processor 170 may transmit electronic device identification information or user identification information to an authentication server. Alternatively, the processor 170 may add at least a part of a security parameter to an authentication request message together with the electronic device identification information or the user identification information, and may transmit the authentication request message to the authentication server. The processor 170 may perform an operation according to specified schedule information, such as an operation of providing a prompt for re-collecting biometric information not matched with the stored information or restricting the use of the processor 170. According to various embodiments of the present disclosure, when transmitting the authentication result, the processor 170 may also transmit signature information or the like to the authentication server.

According to various embodiments of the present disclosure, the electronic device 101 may receive an authentication completion-related message transferred in response to the authentication request message. For example, the processor 170 may receive an authentication-related message from a specified authentication server (e.g., an authentication server corresponding to specific issuance information automatically selected due to execution of an application or selected by a user input). If a received authentication-related message indicates completion of authentication, the processor 170 may transmit signature information. In this operation, the processor 170 may generate the signature information by signing at least a part of specific information (e.g., unique identification information related to the electronic device 101, user information, specified information provided by the secure area 123, or the like) with a private key. If validity of the signature information is confirmed, the authentication server may provide security information to the processor 170.

According to various embodiments of the present disclosure, upon receiving a message related to a non-authenticated or non-registered state from the authentication server, the processor 170 may request registration from the authentication server automatically or without intervention of the user, or without user input. For example, the processor 170 may generate public and private keys based on the security parameter or specific information specified by the secure area 123, and may generate a registration request message including the public key generated. The processor 170 may transmit the registration request message to the authentication server. The authentication server may perform registration according to the registration request message of the processor 170. In this operation, the authentication server may transmit, to the service server 106, the registration request message and the security parameter received during an authentication request process, to check whether the user is a user having a registered account (registered user). Upon receiving a message related to a registered user from the service server 106, the authentication server may parse the public key included in the registration request message, and may store and manage the public key by mapping the public key to the processor 170. The authentication server may perform registration of the processor 170 based on the above-mentioned operation, and may transmit a result of the registration to the processor 170.

In operation 411, the processor 170 may receive security information. In operation 413, the processor 170 may handle execution of a function which requires authentication based on the received security information. For example, the processor 170 may output a screen interface related to execution of payment based on the security information, or may output payment request information related to payment processing based on the security information. According to various embodiments of the present disclosure, the processor 170 may perform a security function (e.g., game, email, secret instant messaging, etc.) of a specific application based on the security information. According to various embodiments of the present disclosure, as the security information is used by the processor 170, the security information may be provided to the authentication server, and execution of the security function may be finally completed as the security information is approved by the authentication server.

In operation 415, the processor 170 may determine whether a function terminates. If the function has not terminated, the process may return to operation 401 so that the process 120 may re-perform operation 401 and the following operations.

Figure 5:
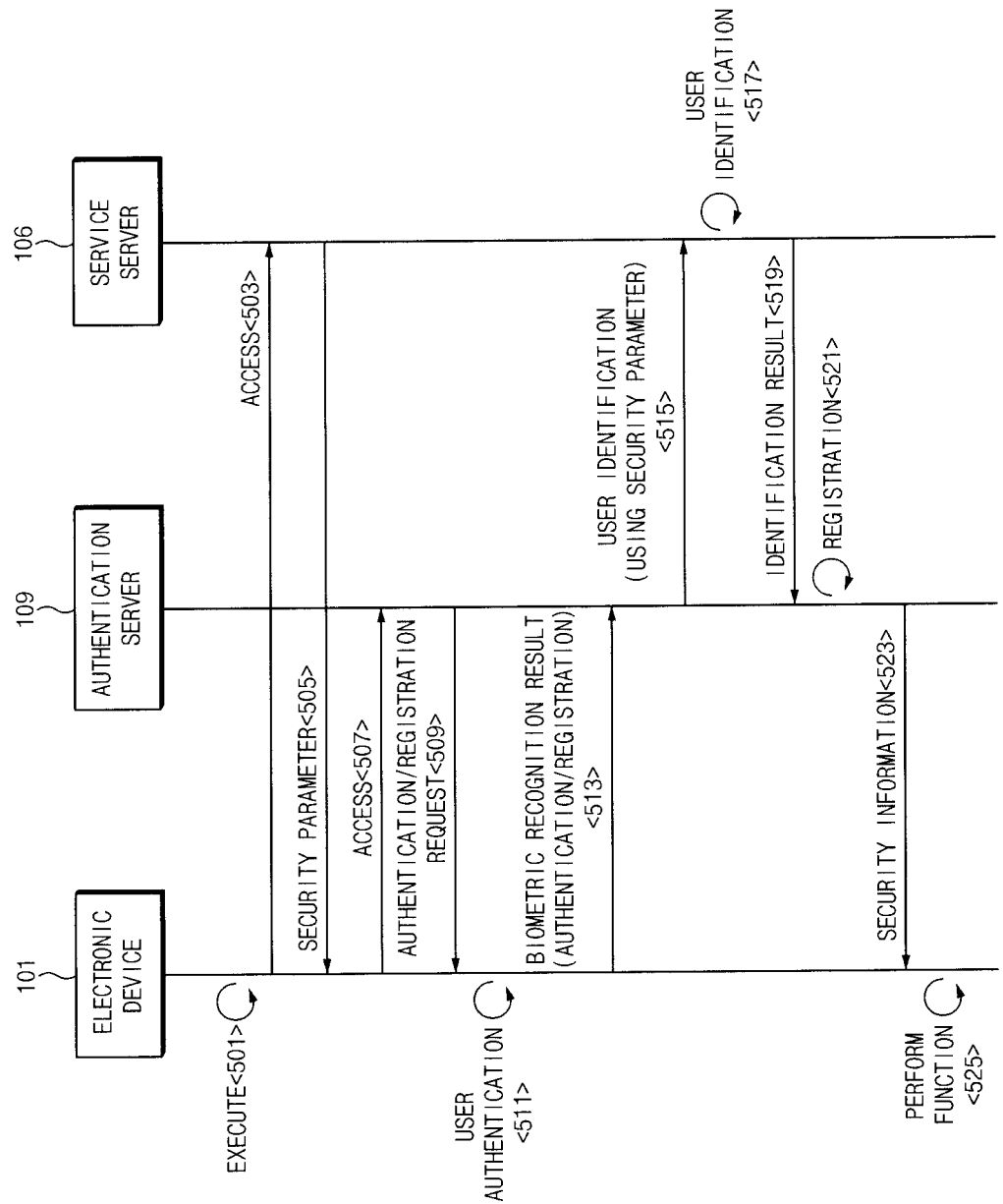
FIG. 5 is a diagram illustrating a registration operation of an authentication processing method according to an embodiment of the present disclosure.

FIG. 5 is a diagram illustrating a registration operation of an authentication processing method according to an embodiment of the present disclosure.

Referring to FIG. 5, in operation 501, the electronic device 101 may execute a specified application in response to occurrence of an event. According to various embodiments of the present disclosure, the electronic device 101 may store issuance information before executing the specified application. According to an embodiment of the present disclosure, the electronic device 101 may capture an image of issuance information issued by a specific financial server or a user function providing server using a camera or the like, and may perform optical character recognition (OCR) analysis on the image, so as to automatically store the issuance information. According to various embodiments of the present disclosure, the electronic device 101 may access a specific user function providing server or the like, may obtain an account ID of the server as the issuance information, and may stored the issuance information.

According to various embodiments of the present disclosure, when storing the issuance information, the electronic device 101 may store the issuance information in association with specified security data (e.g., fingerprint data, retinal scan, or other biometric). While registering non-registered issuance information stored by an authenticated user, the electronic device 101 may check the security data.

In operation 503, as the specified application is executed, the electronic device 101 may access the service server 106. The service server 106 may identify the user of the electronic device 101 accessing the service server 106. For example, the service server 106 may check device information, user information, etc. of the electronic device 101 to determine whether the user is a registered user.

In operation 505, the service server 106 may transmit, to the electronic device 101, a security parameter related to granting an access right.

In operation 507, the electronic device 101 may access at least one authentication server using stored issuance information. For example, the electronic device 101 may access each authentication server corresponding the stored issuance information. Alternatively, the electronic device 101 may access an authentication server corresponding to specified issuance information (e.g., issuance information output to a home screen).

According to various embodiments of the present disclosure, the electronic device 101 may transmit an authentication request message while accessing the authentication server 109. Accordingly, the authentication server 109 may provide, to the service server 106, the authentication request message (e.g., a message including at least a part of a security parameter or a message including at least a biometric recognition result) received from the electronic device 101, and may request the service server 106 to confirm whether the user is a registered user. In the case of a non-registered user device, the authentication server 109 may transmit, to the electronic device 101, information indicating a non-registered state. In relation to checking a non-registered user device, the authentication server 109 may store and manage information (e.g., electronic device identification information, issuance information, user information, etc.) on registered user devices, to determine whether a device is registered or not with respect to an authentication request message of a specific electronic device. Upon receiving the non-registered state information from the authentication server 109, the electronic device 101 may transmit a registration request message to the authentication server 109. Here, the electronic device 101 may add, to the registration request message, a public key generated according to a specified rule to provide the public key to the authentication server 109.

The authentication server 109 may determine whether the electronic device 101 is registered based on at least a part of identification information of the electronic device 101 accessing the authentication server 109, user identification information, and a security parameter. If the electronic device 101 is a non-registered electronic device, the authentication server 109 may request authentication/registration from the electronic device 101 in operation 509.

In operation 511, the electronic device 101 may perform user authentication for identifying a user. For example, the electronic device 101 may perform processing related to a collection of user biometric information, and may compare obtained biometric information with stored biometric information to determine whether the former matches the latter. If the obtained biometric information does not match the stored biometric information, the electronic device 101 may perform processing (e.g., ending an application) for the case of a biometric information mismatch.

When user authentication is completed, the electronic device 101 may generate an authentication registration request message including a biometric recognition result and may transmit the authentication registration request message to the authentication server 109 (e.g., at least one of the first authentication server 107 or the second authentication server 108) in operation 513. The authentication server 109 may represent an authentication server selected by default in relation to the specified application or an authentication server selected by the user. In operation 515, the authentication server 109 may request user identification from the service server 106. In this operation, the authentication server 109 may generate a user identification message including the security parameter, and may transmit the user identification message to the service server 106.

In operation 517, the service server 106 may check user information of the electronic device 101 based on the user identification message. If the electronic device 101 is related to the security parameter provided in operation 505, the service server 106 may provide, to the authentication server 109, an identification result indicating a normal user in operation 519.

In operation 521, as the authentication server 109 receives the identification result, the authentication server 109 may perform registration processing of the electronic device 101. For example, the authentication server 109 may perform registration processing for issuance information requested to be registered by the electronic device 101. In this operation, the authentication server 109 may extract the public key from the registration request message, and may store and manage the public key by mapping public key to the electronic device 101.

In operation 523, the authentication server 109 may provide specified security information to the electronic device 101. The security information may represent information related to execution of a security function of a specified application, such as OTC or specific key information.

In operation 525, the electronic device 101 may perform a function based on the security information.

According to various embodiments of the present disclosure, the user authentication operation performed in operation 511 may be performed prior to operation 507. In this case, the electronic device 101 may access the authentication server while proceeding with user authentication. Alternatively, after user authentication is completed, the electronic device 101 may access the authentication server according to a result of the completion of user authentication. For example, if user authentication is completed normally (e.g., normal completion of fingerprint authentication or ID and password authentication), the electronic device 101 may access the authentication server, or if the user authentication is not completed normally, the electronic device 101 may not access the authentication server.

According to various embodiments of the present disclosure, the authentication/registration request of the authentication server 109 of operation 509 may be skipped. For example, while the issuance information is stored in the electronic device 101, the electronic device 101 may check the non-registered state of the issuance information. Accordingly, if a function based on the non-registered issuance information is requested to be executed, the electronic device 101 may perform a user authentication operation (e.g., fingerprint authentication), and may perform a registration operation by providing, to the authentication server, information (e.g., biometric information) obtained in the user authentication operation and the security parameter obtained from the service server 106 during an execution process of a specified application.

According to various embodiments of the present disclosure, the user authentication operation may be performed prior to execution of the specified application, and may be skipped during an operation process of the specified application based on an execution history. According to an embodiment of the present disclosure, the user authentication operation may be performed in a lock screen release operation of the electronic device 101 or a user authentication request operation of the specified application. In the case where a function which requires authentication is requested to be executed within a specified time after completion of the user authentication, the electronic device 101 may skip the user authentication operation. Here, the electronic device 101 may provide a biometric recognition result to the authentication server based on a history of previously performed user authentication, or may generate and provide signature information to the authentication server.

According to various embodiments of the present disclosure, the electronic device 101, the authentication server, or the service server may allow a registration process for non-registered issuance information to be performed only when user authentication is completed. For example, in operation 509, if the input biometric information does not match the stored biometric information, the electronic device 101 may cancel a registration process of non-registered card information.

Figure 6:
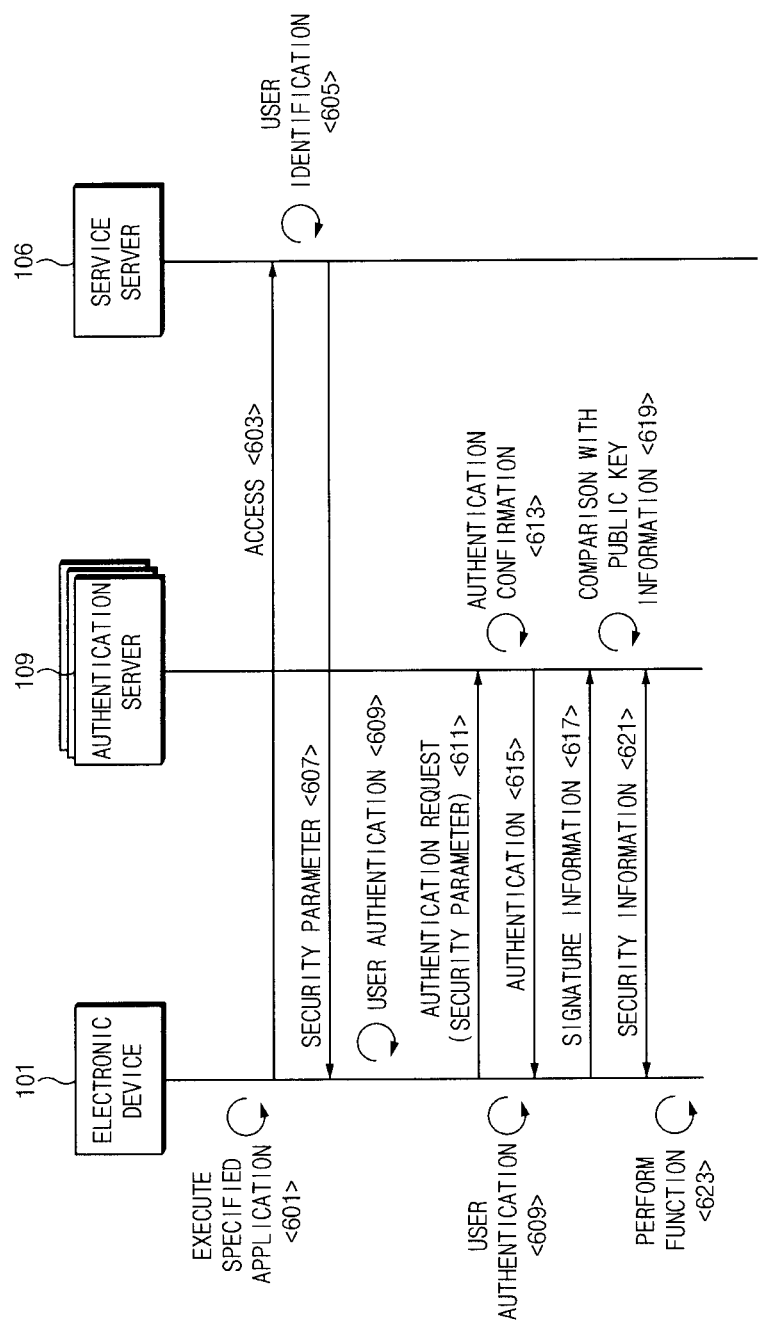
FIG. 6 is a diagram illustrating an authentication operation of an authentication processing method according to an embodiment of the present disclosure.

FIG. 6 is a diagram illustrating an authentication operation of an authentication processing method according to an embodiment of the present disclosure.

Referring to FIG. 6, in operation 601, the electronic device 101 may execute an application in response to occurrence of an event. In operation 603, the electronic device 101 may access the specified service server 106.

In operation 605, the service server 106 may perform user identification in relation to the electronic device 101 attempting to access the service server 106.

In operation 607, if identification of a registered user is successful, the service server 106 may provide a security parameter to the electronic device 101.

In operation 609, user authentication may be performed in response to execution of a specified application or a security function execution request of the application. For example, the user authentication may be performed based on biometric information as described above with respect to operation 509.

Upon completion of the user authentication, the electronic device 101 may transmit an authentication request message including the security parameter to the authentication server 109 in operation 611.

In operation 613, the authentication server 109 may perform authentication confirmation of the electronic device 101 based on the received authentication request message and stored user information. According to an embodiment of the present disclosure, the authentication server 109 may determine whether the electronic device 101 is a registered user device based on identification information of the electronic device 101. According to various embodiments of the present disclosure, the authentication server 109 may request user identification from the service server 106 based on the security parameter included in the authentication request message of the electronic device 101.

If the authentication confirmation is successful, the authentication server 109 may provide an authentication result to the electronic device 101 in operation 615. In the case of authentication failure, the authentication server 109 may provide a message about the authentication failure to the electronic device 101.

Upon receiving the authentication result indicating a normal user from the authentication server 109, the electronic device 101 may transmit signature information to the authentication server 109 in operation 617. The signature information, for example, may be information in which specific information stored in a secure memory area is signed using a private key.

In operation 619, the authentication server 109 may compare the signature information with a public key stored and managed in relation to the electronic device 101 so as to determine whether the signature information is valid signature information.

If a result of the determination indicates validity, the authentication server 109 may provide security information to the electronic device 101. In operation 623, the electronic device 101 may perform a function based on the security information.

Figure 7:
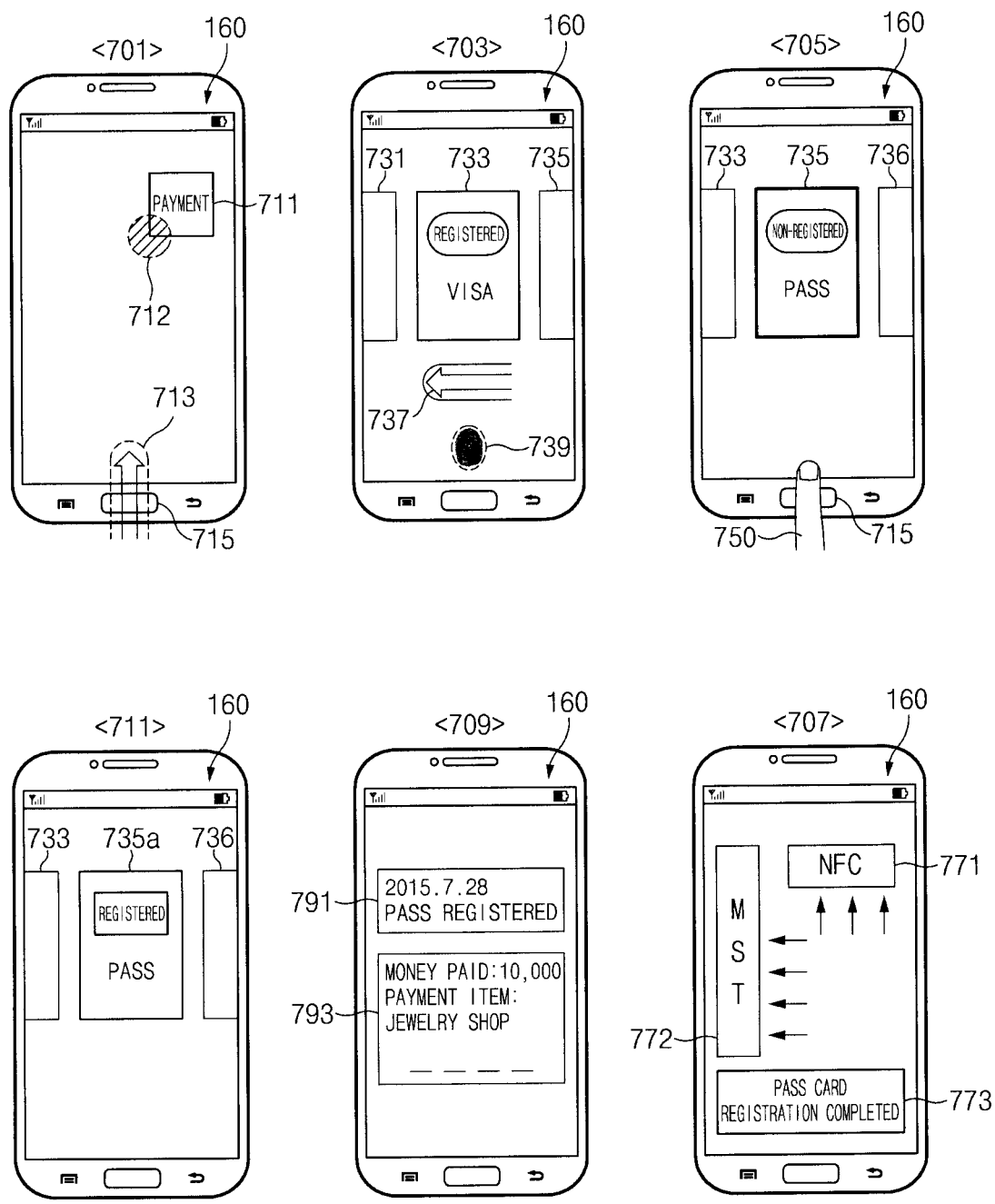
FIG. 7 is a diagram illustrating an example of a screen interface related to authentication processing according to an embodiment of the present disclosure.

FIG. 7 is a diagram illustrating an example of a screen interface related to authentication processing according to an embodiment of the present disclosure.

Referring to FIG. 7, as shown in a state 701, the electronic device 101 may collect occurrence of an event related to execution of a specified application. For example, in a sleep state or a home screen state, the electronic device 101 may recognize a gesture event 713 (e.g., touching a fingerprint sensor 715 or 180 and swiping a finger towards a touch panel center portion, an event of swiping a finger from a specified touch panel portion (e.g., a lower end bezel of the electronic device 101) to an upper side, or an event of touching a touch area above the fingerprint sensor 715 or 180 and swiping a finger upwards, collectively referred to as a fingerprint swipe) specified based on a specific location (e.g., a location in which the fingerprint sensor 715 or 180 is disposed) as an event of requesting execution of a security function of a specified application. According to various embodiments of the present disclosure, the electronic device 101 may output, to the display 150, an icon 711 related to execution of the specified application. If an event 712 of selecting the icon 711 occurs, the electronic device 101 may recognize the event 712 as an event of requesting execution of the specified application (or an event of requesting execution of a security function of the application).

As shown in a state 703, the electronic device 101 may output, to the display 150, a screen interface related to execution of the specified application or execution of the security function. According to an embodiment of the present disclosure, the execution screen interface may display at least a part of first issuance information 731, second issuance information 733, and third issuance information 735. The pieces of issuance information 731, 733, and 735 may include, for example, card information issued by a specified financial server. According to an embodiment of the present disclosure, the second issuance information 733, for example, may be issuance information registered in a specified authentication server. The electronic device 101 may output a message or a display effect so that registered information is differentiated from non-registered information. FIG. 7 exemplarily illustrates text that indicates registered issuance information. The second issuance information 733, the entirety of which is displayed, may be an object to be operated. The electronic device 101 may output a prompt 739 prompting user authentication. The prompt 739, for example, may include an image (such as a generic fingerprint to prompt a fingerprint swipe, or an eye to prompt the user for a retinal scan) or a text related to a request for biometric input based on the biometric sensor 715 or 180.

According to various embodiments of the present disclosure, when an event 737 of switching screens occurs, the electronic device 101 may display other issuance information on the display 150 as shown in a state 705. For example, the electronic device 101 may output at least a part of the second issuance information 733, the third issuance information 735, and fourth issuance information 736. The third issuance information 735, the entirety of which is displayed, may be information to be operated. For example, the electronic device 101 may perform an authentication request or the like based on the third issuance information 735. According to various embodiments of the present disclosure, the third issuance information 735 may be information not registered in the authentication server. The electronic device 101 may display a specified text (or image) on the third issuance information 735 in order to distinguish non-registered information. Alternatively, the electronic device 101 may display the third issuance information 735 in a different manner (e.g., using a different color) from that of other issuance information. Authentication-server-non-registered state information of the third issuance information 735 may be obtained while the electronic device 101 stores the information, or may be checked by receiving a notification on a non-registered state from the authentication server or the service server. In this operation, the electronic device 101 may output a guide message or an image indicating the non-registered state.

The user may make a fingerprint swipe 750. The electronic device 101 may verify validity of collected sensor information (e.g., fingerprint information collected by the fingerprint sensor 715 or 180) by comparing the collected sensor information with stored information, so as to perform user authentication. If the user authentication is successful, the electronic device 101 may request registration from the authentication server 109. In the case of requesting registration based on the third issuance information 735, the authentication server 109 may communicate the result of the registration to the electronic device 101. In this operation, the authentication server 109 may provide, to the service server 106, a user identification request message including at least a security parameter or a user authentication result provided by the electronic device 101, so as to perform user identification.

Alternatively, the electronic device 101 may perform transmission of the registration request message through background processing. When registration for the third issuance information 735 is completed, the authentication server 109 may provide security information to the electronic device 101.

Upon receiving the security information, the electronic device 101 may output, to the display 150, a function execution screen based on the security information as shown in a state 707. According to an embodiment of the present disclosure, the electronic device 101 may perform a payment request based on the security information. In this operation, the electronic device 101 may output, to the display 150, a first object 771 for providing a guide on a payment request through an NFC module and a second object 772 for providing a guide on a payment request through an MST module. According to various embodiments of the present disclosure, the electronic device 101 may output a specified guide message 773 (e.g., at least one of a text or an image) in relation to authentication server registration.

According to various embodiments of the present disclosure, as shown in a state 709, the electronic device 101 may output payment details information to the display 150 in response to payment completion. The payment details information, for example, may be received from at least one of the service server 106, the authentication server 109, a financial server for managing the authentication server 109, or a management server for managing a POS terminal. The payment details information, for example, may include registration information 791 for notifying a registration state of the non-registered third issuance information 735 and payment information 793. According to various embodiments of the present disclosure, the registration information 791 may be generated based on login information of the secure area 123.

If non-registered issuance information is registered in a specified authentication server, a display state may be changed as shown in a state 711. For example, the electronic device 101 may output, to the display 150, issuance information 735a displayed differently from the third issuance information 735 of the state 705. The issuance information 735a may include, for example, a text for indicating a registered state. According to various embodiments of the present disclosure, the electronic device 101 may display, on the display 150, at least a part of other pieces of issuance information 733 and 736 adjacent to the issuance information 735a. If other issuance information does not exist, the issuance information 733 and 736 may not be displayed.

Although the above description is provided with respect to a specific example of card information operation, an electronic seal function of the electronic device 101 may also be operated in the manner described above according to various embodiments of the present disclosure. For example, the electronic device 101 may store an electronic seal. During a process of registering the electronic seal in an authentication server for processing electronic seals, the electronic device 101 may register the electronic seal in the authentication server automatically without intervention of the user based on a security parameter received from the service server 106 and a result of user security authentication. Alternatively, the service server 106 may perform a process related registration and operation of the electronic device 101 by communicating with the authentication server.

According to the above-mentioned various embodiments of the present disclosure, an authentication processing method according to an embodiment of the present disclosure may include receiving a request for execution of a specified security function based on non-registered issuance information, performing automatic registration of the non-registered issuance information in a specified authentication server in response to the request for execution of the security function, and performing the security function based on security information received after performing the registration.

According to the above-mentioned various embodiments of the present disclosure, an authentication processing method according to an embodiment of the present disclosure may include receiving a request for execution of a specified function supported by an application, transmitting, to a second external electronic device via at least one communication module, a result of authentication of a user of an electronic device and a request for registration for a security parameter which corresponds to the user and is received from a first external electronic device, and performing the specified function in response to the request for execution if the registration is successful.

According to various embodiments of the present disclosure, the method may further include authenticating the user of the electronic device using a biometric sensor.

According to various embodiments of the present disclosure, the authenticating may include authenticating the user of the electronic device in response to the request for execution of the specified function.

According to various embodiments of the present disclosure, the method may further include obtaining the result of the authentication performed within a specified time as authentication information of the user of the electronic device.

According to various embodiments of the present disclosure, the method may further include receiving the security parameter corresponding to the user from the first external electronic device in response to execution of the application.

According to various embodiments of the present disclosure, the transmitting may include receiving information indicating a non-registered state from the second external electronic device and automatically transmitting a registration request message to the second external electronic device in response to reception of the information.

According to various embodiments of the present disclosure, the method may further include receiving security information from the second external electronic device, generating a payment request message based on the security information, and outputting the payment request message via the at least one communication module.

According to various embodiments of the present disclosure, the method may further include outputting details of the registration to payment details information obtained by performing the specified function.

According to various embodiments of the present disclosure, the method may further include differently displaying a registered state and the non-registered state.

According to various embodiments of the present disclosure, the method may further include receiving a guide message that notifies completion of the registration and outputting the guide message.

According to various embodiments of the present disclosure, the method may further include providing a user interface related to a user authentication procedure based on biometric information when the request for execution of the specified function is made.

According to various embodiments of the present disclosure, the transmitting may be performed through background processing while the user interface is provided.

Figure 8:
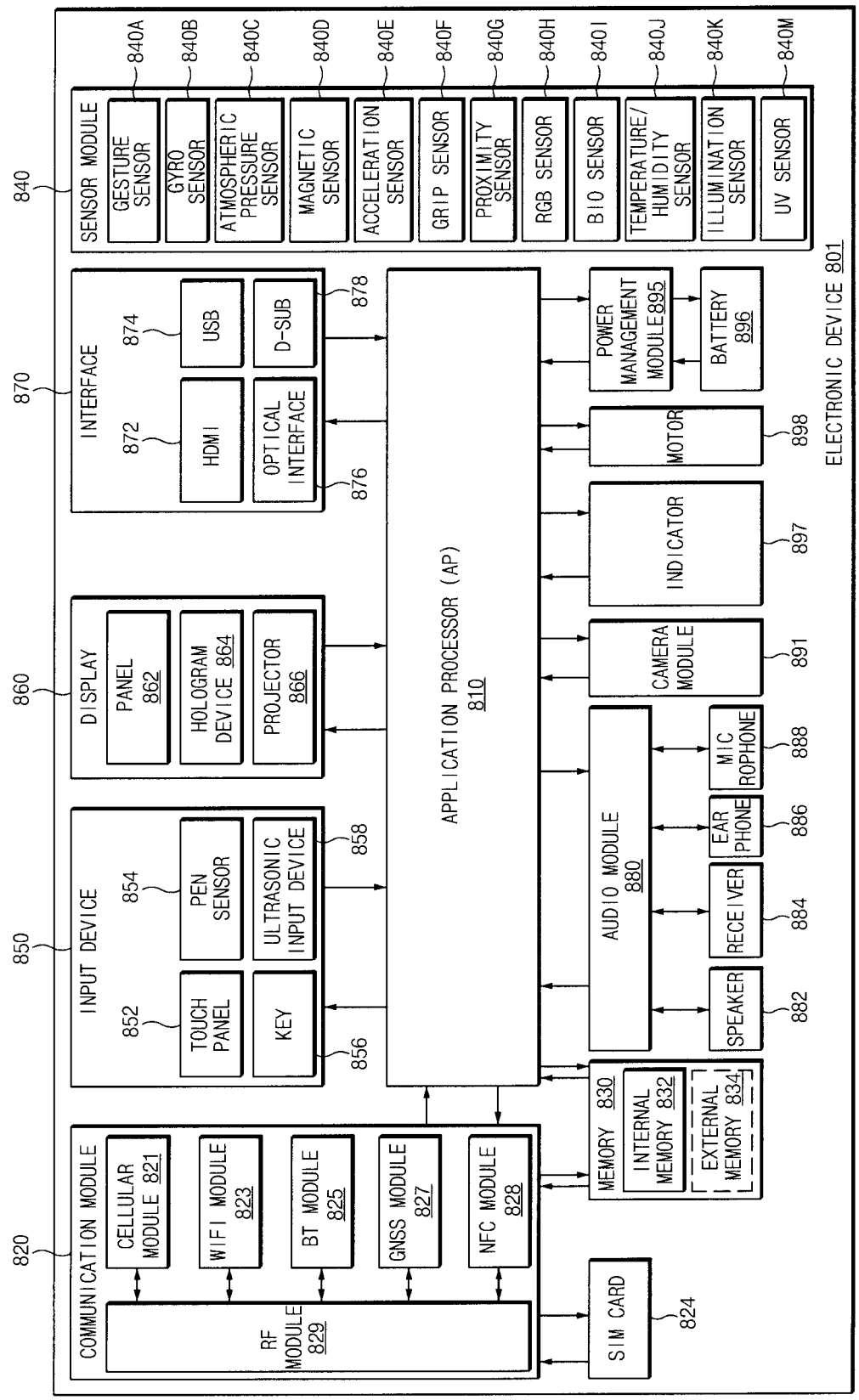
FIG. 8 is a block diagram illustrating an electronic device according to an embodiment of the present disclosure.

FIG. 8 is a block diagram illustrating an electronic device according to an embodiment of the present disclosure.

An electronic device 800 may include, for example, a part or the entirety of the electronic device 101 illustrated in FIG. 2. The electronic device 800 may include at least one processor (e.g., an application processor (AP)) 810, a communication module 820, a subscriber identification module 829, a memory 830, a sensor module 840, an input device 850, a display 860, an interface 870, an audio module 880, a camera module 891, a power management module 895, a battery 896, an indicator 897, and a motor 898.

The processor 810 may run an operating system or an application program so as to control a plurality of hardware or software elements connected to the processor 810, and may process various data and perform operations. The processor 810 may be implemented with, for example, a system on chip (SoC). According to an embodiment of the present disclosure, the processor 810 may further include a graphic processing unit (GPU) and/or an image signal processor. The processor 810 may include at least a portion (e.g., a cellular module 821) of the elements illustrated in FIG. 8. The processor 810 may load, on a volatile memory, an instruction or data received from at least one of other elements (e.g., a nonvolatile memory) to process the instruction or data, and may store various data in a nonvolatile memory. In certain embodiments, the processor 810 can include a non-secure area 121 and a secure area 123.

The communication module 820 may have a configuration that is the same as or similar to that of the communication interface 160 of FIG. 2. The communication module 820 may include, for example, a cellular module 821, a Wi-Fi module 822, a Bluetooth module 823, a GNSS module 824 (e.g., a GPS module, a GLONASS module, a BeiDou module, or a Galileo module), a near field communication (NFC) module 825, a magnetic stripe transmission (MST) module, and a radio frequency (RF) module 827.

The cellular module 821 may provide, for example, a voice call service, a video call service, a text message service, or an Internet service through a communication network. According to an embodiment of the present disclosure, the cellular module 821 may identify and authenticate the electronic device 800 in the communication network using the subscriber identification module 829 (e.g., a SIM card). According to an embodiment of the present disclosure, the cellular module 821 may perform at least a part of functions providable by the processor 810. According to an embodiment of the present disclosure, the cellular module 821 may include a communication processor (CP).

Each of the Wi-Fi module 822, the Bluetooth module 823, the GNSS module 824, the NFC module 825, and the MST module 826 may include, for example, a processor for processing data transmitted/received through the modules. According to some various embodiments of the present disclosure, at least a portion (e.g., at least two) of the cellular module 821, the Wi-Fi module 822, the BT module 823, the GNSS module 824, the NFC module 825, and the MST module 826 may be included in a single integrated chip (IC) or IC package.

The RF module 827 may transmit/receive, for example, communication signals (e.g., RF signals). The RF module 827 may include, for example, a transceiver, a power amp module (PAM), a frequency filter, a low noise amplifier (LNA), an antenna, or the like. According to another embodiment of the present disclosure, at least one of the cellular module 821, the Wi-Fi module 822, the Bluetooth module 823, the GNSS module 824, the NFC module 825, or the MST module 826 may transmit/receive RF signals through a separate RF module.

The subscriber identification module 829 may include, for example, an embedded SIM and/or a card containing a subscriber identity module, and may include unique identification information (e.g., an integrated circuit card identifier (ICCID)) or subscriber information (e.g., international mobile subscriber identity (IMSI)).

The memory 830 (e.g., the memory 130) may include an internal memory 832 or an external memory 834. The internal memory 832 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 834 may include a flash drive, for example, compact flash (CF), secure digital (SD), micro secure digital (Micro-SD), mini secure digital (Mini-SD), extreme digital (xD), multi-media card (MMC), a memory stick, or the like. The external memory 834 may be operatively and/or physically connected to the electronic device 800 through various interfaces.

A security module 836, which is a high-security module compared to the memory 836, may be a circuit that guarantees secure storage of data and a protected execution environment. The security module 836 may be implemented with a separate circuit, and may include a separate processor. The security module 836 may include, for example, an embedded secure element (eSE) embedded in a fixed chip of the electronic device 800 or present in a detachable smart chip or secure digital (SD) card. The security module 836 may be driven by an operating system (OS) different from an OS of the electronic device 800. For example, the security module may be operated based on a Java Card Open Platform (JCOP) operating system.

The sensor module 840 may, for example, measure physical quantity or detect an operation state of the electronic device 800 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one sensor included therein. In some various embodiments of the present disclosure, the electronic device 800 may further include a processor configured to control the sensor module 840 as a part of the processor 810 or separately, so that the sensor module 840 is controlled while the processor 810 is in a sleep state.

In certain embodiments, the gesture sensor 840A can be used to detect gestures such as gesture 737. The biometric sensor 840I can be used for fingerprint swiping 715 or retinal scanning.

The input device 850 may include, for example, a touch panel 852, a (digital) pen sensor 854, a key 856, or an ultrasonic input device 858. The touch panel 852 may employ at least one of capacitive, resistive, infrared, and ultraviolet sensing methods. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone (e.g., a microphone 888) so as to identify data corresponding to the ultrasonic waves sensed.

The display 860 (e.g., the display 150) may include a panel 862, a hologram device 864, or a projector 866. The panel 862 may have a configuration that is the same as or similar to that of the display 150 of FIG. 2. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 800. According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature (D-sub) 878. The interface 870, for example, may be included in the communication interface 160 illustrated in FIG. 2. Additionally or alternatively, the interface 870 may include, for example, a mobile high-definition link (MHL) interface, a secure digital (SD) card/multi-media card (MMC) interface, or an infrared data association (IrDA) interface.

The audio module 880 may convert, for example, a sound into an electrical signal or vice versa. At least a portion of elements of the audio module 880 may be included in the input/output interface 140 illustrated in FIG. 2. The audio module 880 may process sound information input or output through a speaker 882, a receiver 884, an earphone 886, or the microphone 888.

According to an embodiment of the present disclosure, the camera module 891 for shooting a still image or a video may include, for example, at least one image sensor (e.g., a front sensor or a rear sensor), a lens, an image signal processor (ISP), or a flash (e.g., an LED or a xenon lamp). In certain embodiments, the camera module 891 can be used to perform retinal scanning.

The power management module 895 may manage power of the electronic device 800. According to an embodiment of the present disclosure, the power management module 895 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 800 or a part thereof (e.g., the processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 800. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 9:
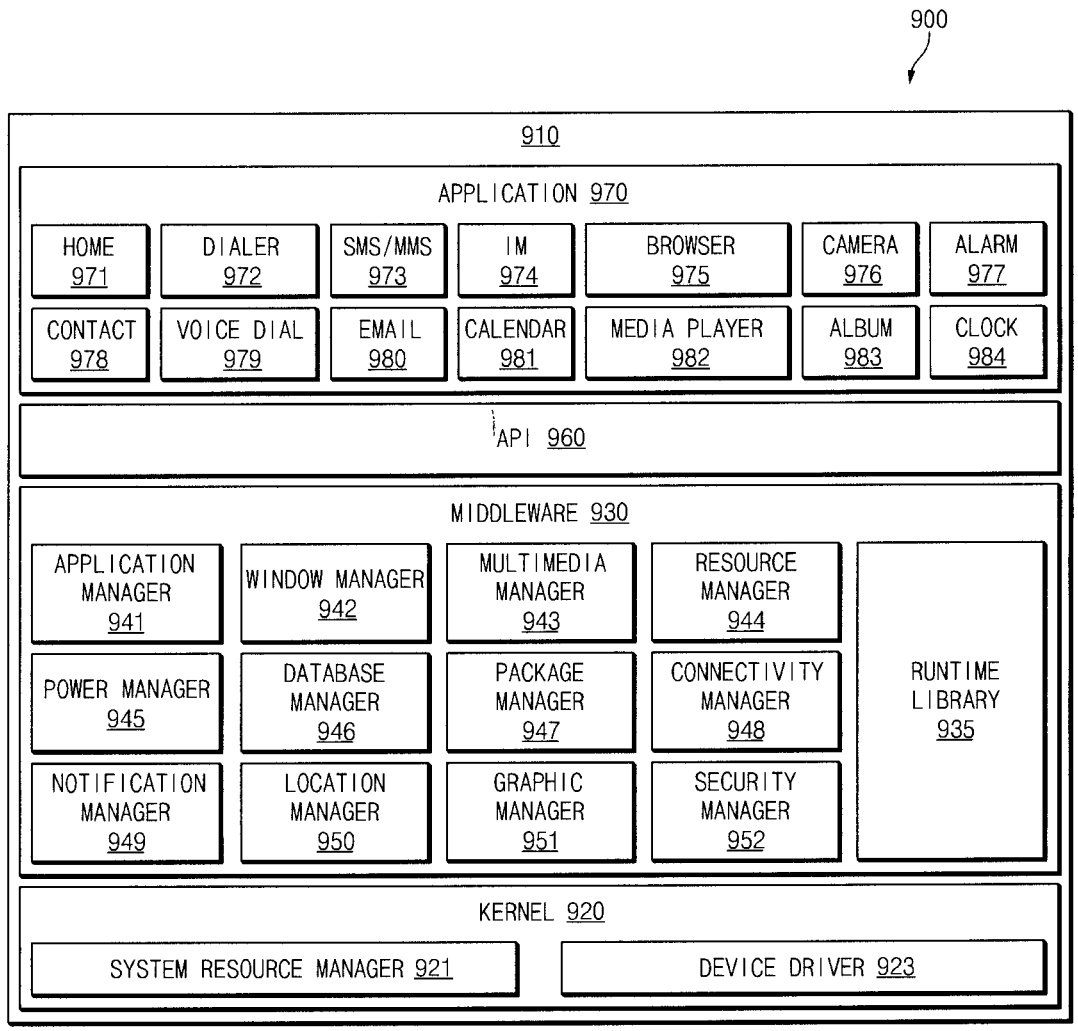
FIG. 9 is a diagram illustrating a program block according to an embodiment of the present disclosure.

FIG. 9 is a diagram illustrating a program block according to an embodiment of the present disclosure.

Referring to FIG. 9, a program module 910 (e.g., a program 140) according to various embodiments of the present disclosure may include an operating system (OS) for controlling a resource related to an electronic device (e.g., the electronic device 101) and/or various applications (e.g., an application program 147) running on the OS. The application program 147 may include a security function application, for example, a security operation information application related to at least one of a banking application, a stock application, an email application, a data management application, a cloud application, a payment application, a user authentication application, or an electronic seal application.

The operating system may be, for example, Android, iOS, Windows, Symbian, Tizen, Bada, or the like.

The program module 910 may include a kernel 920, a middleware 930, an application programming interface (API) 960, and/or an application 970. At least a part of the program module 910 may be preloaded on an electronic device or may be downloaded from an external electronic device (e.g., the electronic device 102 or 104 or the server 106).

The kernel 920 (e.g., a kernel 141) may include, for example, a system resource manager 921 and/or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 so that the applications 970 may efficiently use limited system resources in the electronic device. According to an embodiment of the present disclosure, the middleware 930 (e.g., a middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager.

The runtime library 935 may include, for example, a library module that a compiler uses to add a new function through a programming language while the application 970 is running. The runtime library 935 may perform a function for input/output management, memory management, or an arithmetic function.

The application manager 941 may mange, for example, a life cycle of at least one of the applications 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the applications 970.

The power manager 945, for example, may operate together with a basic input/output system (BIOS) to manage a battery or power and may provide power information required for operating the electronic device. The database manager 946 may generate, search, or modify a database to be used in at least one of the applications 970. The package manager 947 may manage installation or update of an application distributed in a package file format.

The connectivity manger 948 may manage wireless connection of Wi-Fi, Bluetooth, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case in which an electronic device (e.g., the electronic device 101) includes a phone function, the middleware 930 may further include a telephony manager for managing a voice or video call function of the electronic device. The payment manager may relay information for payment from the application 970 to another application 970 or the kernel 920. Furthermore, the payment manager may store, in the electronic device, payment information received from external device, or may transfer information stored therein to the external device.

The middleware 930 may include a middleware module for forming a combination of various functions of the above-mentioned elements. The middleware 930 may provide a module specialized for each type of an operating system to provide differentiated functions. Furthermore, the middleware 930 may delete a part of existing elements or may add new elements dynamically.

The API 960 (e.g., an API 145) which is, for example, a set of API programming functions, may be provided in different configurations according to an operating system. For example, in the case of Android or iOS, one API set may be provided for each platform, and, in the case of Tizen, at least two API sets may be provided for each platform.

The application 970 (e.g., the application program 147), for example, may include at least one application capable of performing functions such as a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a clock 984, payment, health care (e.g., measure an exercise amount or blood sugar), or environmental information provision (e.g., provide air pressure, humidity, or temperature information).

According to an embodiment of the present disclosure, the application 970 may include an application (hereinafter referred to as an "information exchange application") for supporting information exchange between the electronic device (e.g., the electronic device 101) and an external electronic device (e.g., the electronic device 102 or 104). The information exchange application may include, for example, a notification relay application for relaying specific information to the external electronic device or a device management application for managing the external electronic device.

For example, the notification relay application may have a function for relaying, to an external electronic device (e.g., the electronic device 102 or 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the electronic device 102 or 104) communicating with the electronic device, an application running in the external electronic device, or a service (e.g., a call service or a message service) provided from the external electronic device.

According to an embodiment of the present disclosure, the application 970 may include a specified application (e.g., a healthcare application of a mobile medical device) according to an attribute of the external electronic device (e.g., the electronic device 102 or 104). According to an embodiment of the present disclosure, the application 970 may include an application received from an external electronic device (e.g., the server 106 or the electronic device 102 or 104). According to an embodiment of the present disclosure, the application 970 may include a preloaded application or a third-party application downloadable from a server. The names of the elements of the program module 910 illustrated may vary with the type of an operating system.

According to various embodiments of the present disclosure, at least a part of the program module 910 may be implemented with software, firmware, hardware, or a combination thereof. At least a part of the program module 910, for example, may be implemented (e.g., executed) by a processor (e.g., the processor 170). At least a part of the program module 910 may include, for example, a module, a program, a routine, sets of instructions, or a process for performing at least one function.

The term "module" used herein may represent, for example, a unit including one of hardware, or hardware with memory storing executable instructions, or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 170), the processor may perform functions corresponding to the instructions. The computer-readable storage medium may be, for example, the memory 130.

The computer-readable storage medium may include a hard disk, a floppy disk, a magnetic medium (e.g., a magnetic tape), an optical medium (e.g., a compact disk read only memory (CD-ROM) and a digital versatile disc (DVD)), a magneto-optical medium (e.g., a floptical disk), or a hardware device (e.g., a read only memory (ROM), a random access memory (RAM), or a flash memory). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

According to various embodiments of the present disclosure, a computer-readable recording medium according to an embodiment of the present disclosure may include at least one instructions set to perform receiving a request for execution of a specified function supported by an application, transmitting, to a second external electronic device via at least one communication module, a result of authentication of a user of an electronic device and a request for registration for a security parameter which corresponds to the user and is received from a first external electronic device, and performing the specified function in response to the request for execution if the registration is successful. As described above, according to various embodiments of the present disclosure, registration and authentication procedures may be performed with ease based on simple user interface (UI)/user experience (UX).

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added. The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. An electronic device comprising:
at least one communication module; and
a processor operatively connected to the at least one communication module,
wherein the processor is configured to:
receive an input to execute an application related to a specified function which is associated with a first external electronic device;
determine whether the application is required authentication of a user;
when the application is required authentication, access the first external electronic device through the at least one communication module and receive a security parameter, which corresponds to the user, from the first external electronic device;
store the security parameter into a memory;
wherein the processor is further configured to:
access a second external electronic device through the at least one communication module;
obtain a biometric information and perform the authentication based on the biometric information;
transmit a result of the authentication of the user of the electronic device, the security parameter, and a request for registration for the security parameter to the second external electronic device via the at least one communication module, wherein the second external electronic device identifies the user by transmitting a user identification message including the security parameter to the first external electronic device, and registers the security parameter based on an identification result verifying the user received from the first external electronic device; and
perform the specified function in response to the request for execution if the registration is successful through the second external electronic device.

2. The electronic device of claim 1, wherein the processor is configured to use the result of the authentication performed within a specified time for the authentication of the user.

3. The electronic device of claim 1, wherein the processor is configured to automatically transmit the request for registration to the second external electronic device in response to reception of information indicating a non-registered state from the second external electronic device.

4. The electronic device of claim 3, wherein the processor is configured to add a specified public key to the request for registration and transmit the request to the second external electronic device.

5. The electronic device of claim 1, wherein the processor is configured to generate a payment request message based on security information received from the second external electronic device, and output the payment request message via the at least one communication module.

6. The electronic device of claim 1, wherein the processor is configured to output details of the registration and payment details information obtained by performing the specified function.

7. The electronic device of claim 1, wherein the processor is configured to differently display a specified indicator object related to the security parameter based on a registered state or a non-registered state, or output a guide message notifying completion of the registration.

8. The electronic device of claim 1, wherein the processor is configured to:
provide a user interface (UI) related to an authentication procedure based on the biometric information when the request for execution of the specified function is made; and
perform processing required for the registration by background processing while the UI is provided.

9. An authentication processing method of an electronic device comprising:
receiving an input to execute an application related to a specified function which is associated with a first external electronic device;
determining whether the application is required authentication of a user;
accessing the first external electronic device through the at least one communication module;
receiving, by an electronic device, a security parameter, which corresponds to the user, from the first external electronic device when the application is required authentication;
storing the security parameter into a memory;
accessing a second external electronic device through the at least one communication module;
obtain a biometric information and performing the authentication based on the biometric information;
transmitting, to the second external electronic device via at least one communication module, a result of the authentication of the user of the electronic device, the security parameter, and a request for registration for the security parameter, wherein the second external electronic device identifies the user by transmitting a user identification message including the security parameter to the first external electronic device, and registers the security parameter based on an identification result verifying the user received from the first external electronic device; and
performing the specified function in response to the request for execution if the registration is successful through the second external electronic device.

10. The authentication processing method of claim 9, further comprising obtaining the result of the authentication performed within a specified time as authentication information of the user of the electronic device.

11. The authentication processing method of claim 9, wherein the transmitting comprises:
automatically transmitting a request for registration to the second external electronic device in response to reception of information indicating a non-registered state from the second external electronic device.

12. The authentication processing method of claim 9, further comprising:
receiving security information from the second external electronic device;
generating a payment request message based on the security information; and
outputting the payment request message via the at least one communication module.

13. The authentication processing method of claim 9, further comprising at least one of:
outputting details of the registration and payment details information obtained by performing the specified function;
differently displaying a specified indicator object related to the security parameter based on a registered state or a non-registered state; or
receiving a guide message that notifies completion of the registration and outputting the guide message.

14. The authentication processing method of claim 9, further comprising:
providing a user interface (UI) related to an authentication procedure based on the biometric information when the request for execution of the specified function is made,
wherein the transmitting is performed by background processing while the UI is provided.

* * * * *